(12) United States Patent
Yin et al.

(10) Patent No.: US 11,193,830 B2
(45) Date of Patent: Dec. 7, 2021

(54) SPECTROCOLORIMETER IMAGING SYSTEM

(71) Applicants: APPLE INC., Cupertino, CA (US); INSTRUMENT SYSTEMS OPTISCHE MESSTECHNIK GMBH, Munich (DE)

(72) Inventors: Ye Yin, Sunnyvale, CA (US); Yi-Fan Chou, Monterey Park, CA (US); Anuj Bhatnagar, San Jose, CA (US)

(73) Assignee: Instrument Systems Optische Messtechnik GmbH, Munich (DE)

( * ) Notice: Subject to any disclaimer, the term of this patent is extended or adjusted under 35 U.S.C. 154(b) by 0 days.

(21) Appl. No.: 16/160,584

(22) Filed: Oct. 15, 2018

(65) Prior Publication Data

US 2019/0120694 A1 Apr. 25, 2019

Related U.S. Application Data

(63) Continuation of application No. 14/099,802, filed on Dec. 6, 2013, now abandoned.

(60) Provisional application No. 61/808,549, filed on Apr. 4, 2013.

(51) Int. Cl.
*H04N 17/00* (2006.01)
*G01J 3/50* (2006.01)
*G01J 3/52* (2006.01)

(52) U.S. Cl.
CPC .............. *G01J 3/502* (2013.01); *G01J 3/50* (2013.01); *G01J 3/524* (2013.01)

(58) Field of Classification Search
CPC .... G01J 3/502; G01J 3/524; G01J 3/50; G01J 3/51; G01J 3/465; G01J 3/506; G01J 3/021; G01J 3/18; G01J 2003/2826; G01J 3/0294; G01J 3/2823; G09G 2320/0666; G09G 5/026; G09G 2320/0673; H04N 13/324; H04N 13/334; H04N 2209/043; H04N 9/67; H04N 9/735; G06T 7/90
See application file for complete search history.

(56) References Cited

U.S. PATENT DOCUMENTS

| | | | | |
|---|---|---|---|---|
| 5,272,518 A | * | 12/1993 | Vincent | G01J 3/12 250/226 |
| 5,850,472 A | * | 12/1998 | Alston | G01J 3/524 382/162 |
| 6,362,849 B1 | * | 3/2002 | Caisey-Bluteau | G01J 3/50 348/222.1 |

(Continued)

*Primary Examiner* — Mohamed K Amara
(74) *Attorney, Agent, or Firm* — Adams and Reese LLP; Raymond R. Ferrera

(57) ABSTRACT

A spectro-colorimeter system for imaging pipeline is provided, the system including a camera system; a spectrometer system; and a controller coupling the camera system and the spectrometer system. In some embodiments the camera system is configured to provide a color image with the first portion of the incident light. Also, in some embodiments the spectrometer system is configured to provide a tristimulus signal from the second portion of the incident light. Furthermore, in some embodiments the controller is configured to correct the color image from the camera system using the tristimulus signal from the spectrometer. An imaging pipeline method for using a system as above is also provided. Further, a method for color selection in an imaging pipeline calibration is provided.

6 Claims, 16 Drawing Sheets

(56) References Cited

U.S. PATENT DOCUMENTS

| | | | |
|---|---|---|---|
| 6,381,009 B1* | 4/2002 | McGahan | G01B 11/0641 356/369 |
| 6,549,653 B1* | 4/2003 | Osawa | H04N 1/60 358/504 |
| 6,856,354 B1* | 2/2005 | Ohsawa | H04N 1/6086 348/223.1 |
| 7,362,357 B2* | 4/2008 | Brown | G01J 3/46 345/604 |
| 7,710,560 B2* | 5/2010 | Holub | G01J 3/02 356/300 |
| 9,076,363 B2* | 7/2015 | Yin | G01J 3/18 |
| 9,372,067 B2* | 6/2016 | Straub | G01B 9/0203 |
| 2002/0001080 A1* | 1/2002 | Miller | G01J 1/08 356/326 |
| 2003/0020703 A1* | 1/2003 | Holub | G01J 3/0262 345/207 |
| 2005/0248786 A1* | 11/2005 | Tobie | H04N 1/6033 358/1.9 |
| 2005/0285129 A1* | 12/2005 | Jackson, III | G01N 21/6456 257/98 |
| 2006/0197757 A1* | 9/2006 | Holub | H04N 1/6058 345/207 |
| 2007/0139648 A1* | 6/2007 | Singh | G01N 21/553 356/337 |
| 2007/0242064 A1* | 10/2007 | Kuo | G09G 3/2003 345/207 |
| 2007/0272844 A1* | 11/2007 | Dominic | G01J 1/0444 250/239 |
| 2009/0141042 A1* | 6/2009 | Shannon | G01J 3/51 345/600 |
| 2009/0201498 A1* | 8/2009 | Raskar | G03B 35/20 356/310 |
| 2010/0245650 A1* | 9/2010 | Kreysar | G01J 3/0208 348/311 |
| 2010/0302596 A1* | 12/2010 | Miyanaga | H04N 1/6058 358/3.23 |
| 2011/0050845 A1* | 3/2011 | Muhammed | G01J 3/0256 348/40 |
| 2011/0050984 A1* | 3/2011 | Schulz | C12M 35/02 348/370 |
| 2011/0075928 A1* | 3/2011 | Jeong | G02B 27/58 382/181 |
| 2012/0183213 A1* | 7/2012 | Robles-Kelly | G06K 9/00362 382/165 |
| 2013/0301004 A1* | 11/2013 | Kahn | A61B 3/10 351/206 |
| 2014/0055592 A1* | 2/2014 | Wei | G01J 3/465 348/79 |
| 2014/0111807 A1* | 4/2014 | Yin | G01J 3/502 356/402 |
| 2014/0192209 A1* | 7/2014 | Yin | G01J 3/524 348/191 |
| 2014/0300753 A1* | 10/2014 | Yin | G01J 3/502 348/187 |

* cited by examiner

SPECTROCOLORIMETER IMAGING SYSTEM

CROSS-REFERENCE TO RELATED APPLICATIONS

The present application claims the benefit under 35 U.S.C. 119(e) of U.S. Prov. Pat. Appl. No. 61/808,549, entitled "IMAGING PIPELINE FOR SPECTRO-COLORIMETERS", by Ye YIN, et al. filed on Apr. 4, 2013, the contents of which are hereby incorporated herein by reference, in its entirety, for all purposes.

The present disclosure is related to U.S. patent application Ser. No. 13/736,058, entitled "PARALLEL SENSING CONFIGURATION COVERS SPECTRUM AND COLORIMETRIC QUANTITIES WITH SPATIAL RESOLUTION," by Ye Yin et al., filed on Jan. 7, 2013, the contents of which are hereby incorporated by reference in their entirety, for all purposes.

FIELD OF THE DESCRIBED EMBODIMENTS

The described embodiments relate generally to methods, devices, and systems for an imaging pipeline, and more particularly to an optical test equipment/method for display testing that features a calibration configuration including spectral and colorimetric measurements with spatial resolution.

BACKGROUND

In the field of spectro-colorimeters, calibration procedures of an imaging system for image correction and a spectroscopic system for color correction are performed regularly. Imaging system calibration typically measures display artifacts such as black and yellow mura, Moire patterns, display non-uniformity, linearization, and dark current correction. Conventionally, spectrometers are the typical instruments for color measurement. However, spectrometers can only measure one spot of flat uniform colors, while typical imaging system measure extended images in at least two dimensions to detect display artifacts. Using digital cameras as a means of color measurement device overcomes this limitation, but performance of digital cameras in terms of accuracy, resolution, precise color rendition is lower than spectrometers. A compromise is therefore made between a fast and inaccurate system using a digital camera, or a slow and highly precise system that alternates between a camera and a spectrometer.

Therefore, what is desired is a method and a system for calibration of a spectro-colorimeter that is fast and provides high color accuracy and resolution together with detailed image correction capabilities.

SUMMARY OF THE DESCRIBED EMBODIMENTS

In a first embodiment, a spectro-colorimeter system for imaging pipeline is provided, the system including a camera system including a separating component and a camera. The separating component directs a first portion of an incident light to the camera system. The system may also include a spectrometer system having an optical channel, a slit, and a spectroscopic resolving element, the separating component directing a second portion of the incident light to the spectrometer system through the optical channel; a controller coupling the camera system and the spectrometer system. In some embodiments the camera system is configured to provide a color image with the first portion of the incident light. Also, in some embodiments the spectrometer system is configured to provide a tristimulus signal from the second portion of the incident light. Furthermore, in some embodiments the controller is configured to correct the color image from the camera system using the tristimulus signal from the spectrometer.

In a second embodiment, an imaging pipeline method is provided, the method including providing a calibration target and receiving Red, Green, and Blue (RGB) data from a camera system. Also, the method may include receiving tristimulus (XYZ) data from a spectrometer system; providing a color correction matrix; and providing an error correction to the camera system.

In yet another embodiment a method for color selection in an imaging pipeline calibration is provided. The method may include selecting a training sample and including the training sample in a predictor set when the training sample is not already included. The method may also include obtaining a color correction matrix using the predictor set; obtaining an error value using the color correction matrix and a plurality of test samples; and forming a set of error values from a plurality of predictor sets when no more training samples are selected. Furthermore, the method may include selecting a training sample and a predictor set form a set of error values and providing the color correction matrix and the selected predictor set when the error value is less than a tolerance.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings. These drawings do not limit any changes in form and detail that may be made to the described embodiments. Any such changes do not depart from the spirit and scope of the described embodiments.

In the figures, elements referred to with the same or similar reference numerals include the same or similar structure, use, or procedure, as described in the first instance of occurrence of the reference numeral.

DETAILED DESCRIPTION OF SELECTED EMBODIMENTS

Figure 1:
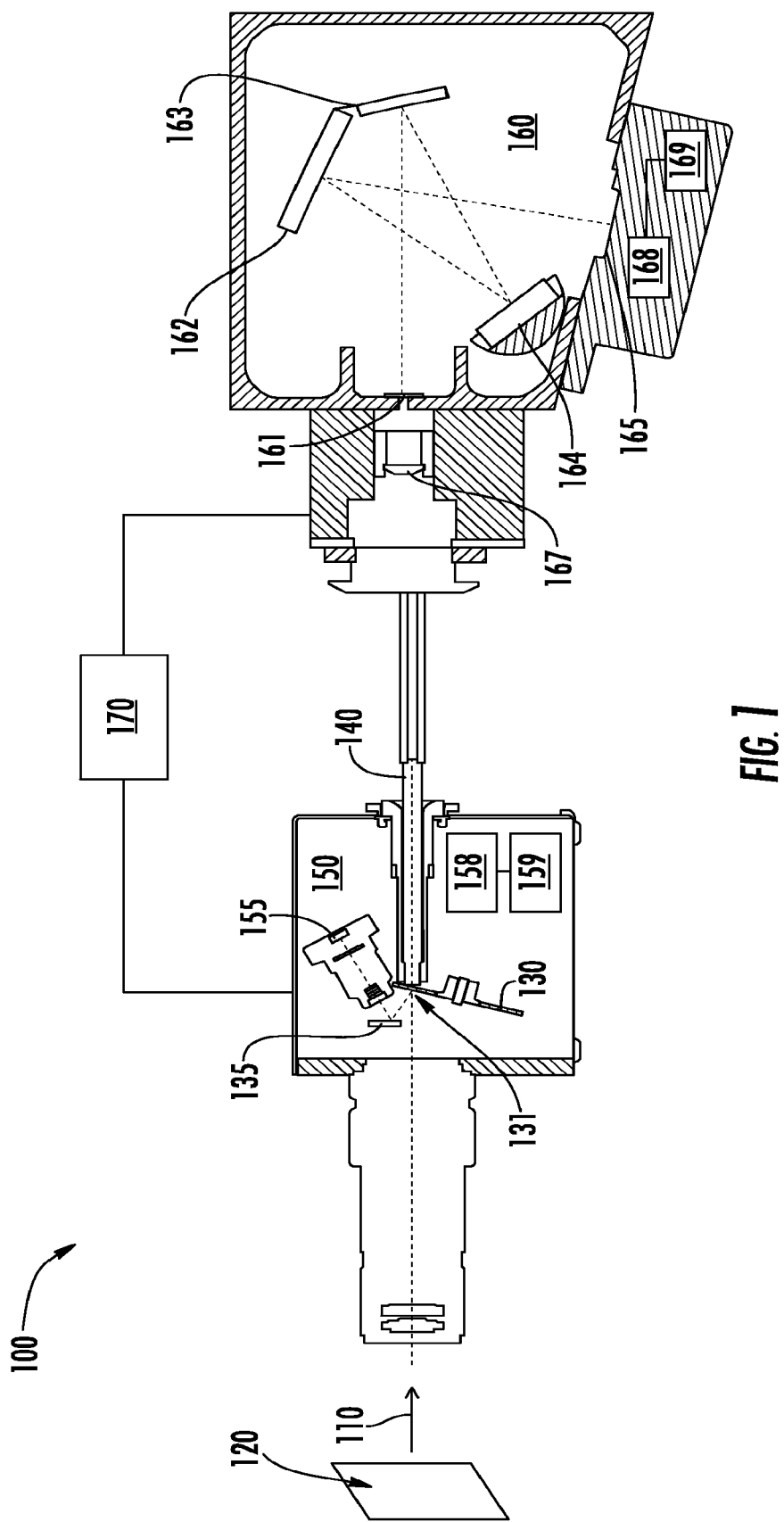
FIG. 1 illustrates a spectro-colorimeter system for handling an imaging pipeline, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Color measurement instruments fall into two general categories: broadband and narrowband. A broadband measurement instrument reports up to 3 color signals obtained by optically processing the input light through broadband filters. Photometers are the simplest example, providing a measurement only of the luminance of a stimulus. Photometers may be used to determine the nonlinear calibration function of displays. Densitometers are an example of broadband instruments that measure optical density of light filtered through red, green and blue filters. Colorimeters are another example of broadband instruments that directly report tristimulus (XYZ) values, and their derivatives such as CIELAB (i.e., International Commission on Illumination—CIE, French translation—1976 (L*, a*, b*) color space). Under the narrowband category fall instruments that report spectral data of dimensionality significantly larger than three.

Spectrophotometers and spectro radiometers are examples of narrowband instruments. These instruments typically record spectral reflectance and radiance respectively within the visible spectrum in increments ranging from 1 to 10 nm, resulting in 30-200 channels. They also have the ability to internally calculate and report tristimulus coordinates from a narrowband spectral data. Spectro radiometers can measure both emissive and reflective stimuli, while spectrophotometers measure reflective stimuli, colorimeters or imaging photometers are imaging devices that behave like a camera. In some embodiments, imaging colorimeters include a time-sequential configuration or a Bayer-filter configuration. In some embodiments the time-sequential configuration separates the measurement objective color in a time sequential manner by spinning a color wheel. At any particular moment, the measurement objective photons with a selected color transmit through the filter and hit the embedded CCD or CMOS imager inside the colorimeter. Accordingly, the overall display color information and imaging is reconstructed after at least one cycle of the color wheel spinning. In some embodiments, the imaging colorimeter separates color channels using a Bayer filter configuration. A Bayer filter configuration includes a color filter array composed of periodically aligned 2×2 filter element. The 2×2 filter element may include two green filters, one red filter and one blue filter. The time-sequential configuration may be more precise than the Bayer filter configuration. On the other hand, the Bayer filter configuration may be faster than the time-sequential configuration. Further, the Bayer filter configuration has a 'one-shot' capability for extracting color information, albeit with limited resolution. In some embodiments, an imaging colorimeter may include a spatial Foveon filter separating colors using a vertically stacked photodiode layer.

In embodiments disclosed herein a spectro-colorimeter including a camera-based display color measurement system has a master-slave structure. More specifically, in some embodiments a spectrometer is a master device, driving a camera as a slave device. The spectro-colorimeter includes a controller that adjusts camera accuracy to match the spectrometer accuracy, maintaining an image pipeline. Adjusting camera accuracy includes building a characterization model using a color correction matrix. The color correction matrix transforms the camera color space to spectrometer color space. Accordingly, the color correction matrix is a transformation between RGB values (a first 3-dimensional vector) and XYZ values (a second 3-dimensional vector). Since the spectrometer and the camera are integrated in a spectro-colorimeter system, the color correction matrix can be generated in real time. Thus, a continuous and fluid imaging pipeline is established for display testing.

FIG. 1 illustrates a spectro-colorimeter system 100 for handling an image pipeline, according to some embodiments. Spectro-colorimeter system 100 includes a camera system 150, a spectrometer system 160, and a controller system 170. Controller system 170 provides data exchange and control commands between spectrometer system 160 and camera system 150. Also shown in FIG. 1 is characterization target 120. Characterization target 120 provides an optical target so that camera 150 may form a 2-dimensional (2D) image on a sensor array in an image plane of a camera 155. In some embodiments the sensor array is a 2D charge-coupled device (CCD) or complementary metal-oxide system (CMOS) sensor array. In some embodiments, characterization target 120 may be an emissive target, or a reflective target. Examples of characterization target 120 may include a liquid crystal display (LCD), a light emitting diode (LED) display, or any other type of TV or display, such as used in a TV, a computer, a cellular phone, a laptop, a tablet computer or any other portable or handheld device.

Spectro-colorimeter system 100, as in embodiments disclosed herein is able to acquire a high resolution spectrum and form an imaging pipeline simultaneously. Accordingly, the spectral measurement and the imaging may share the measurement lighting area at approximately the same or similar time. Light 110 from characterization target 120 is incident on a separating component 130 which splits a portion of incident light 110 towards camera system 150, and a portion of incident light 110 toward spectral system 160. Accordingly, in some embodiments separating component 130 is a beam splitter. Further according to some embodiments, separating component 130 may be a mirror having an aperture 131 on the surface.

A portion of incident light 110 separated by separating component 130 is directed by optical channel 140 into spectrometer system 160. Optical channel 140 may include an optical channel, a transparent conduit, lenses and mirrors, and free space optics. Lens 167 focuses the incident light through a slit 161 into spectrometer system 160. Spectrometer system 160 may include a collimating mirror 162, a spectroscopic resolving element 164, a focusing mirror 163, and a detector array 165. Accordingly, in some embodiments slit 161, mirrors 162 and 163, spectroscopic resolving element 164 and sensor array 165 are arranged in a crossed Czerny-Turner configuration. In some embodiments, spectroscopic resolving element 164 may be a diffraction grating or a prism. One of ordinary skill in the art will recognize that the peculiarities of the spectrometer system configuration are not limiting to embodiments consistent with the present disclosure. Spectrometer system 160 may include a processor circuit 168 and a memory circuit 169. Memory circuit 169 may store commands the when executed by processor 168 cause spectrometer system 160 to perform the many different operations consistent with embodiments in the present disclosure. For example, processor circuit 168 may establish communication with controller circuit 170, and provide data and commands to camera system 150. Processor circuit 168 may also be configured to execute commands provided by controller 170. In some embodiments, processor circuit 168 may provide a tristimulus vector XYZ to controller 170. Accordingly, the tristimulus vector XYZ may include highly resolved spectral information from characterization target 120 provided by spectroscopic system 160 to controller 170.

A portion of incident light 110 reflected from separating component 130 is directed by optical component 135 towards imaging camera 155. Optical component 135 may include a mirror, a lens, a prism, or any combination of the above. Camera system 150 may include processor circuit 158 and a memory circuit 159. Memory circuit 159 may store commands the when executed by processor 158 cause camera system 150 to perform the many different operations consistent with embodiments in the present disclosure. For example, processor circuit 158 may establish communication with controller circuit 170, and provide data and commands to spectrometer system 160. Processor circuit 158 may also be configured to execute commands provided by controller 170. Also, in some embodiments processor circuit 158 provides RGB values measured by camera system 150 to controller 170.

Thus, embodiments consistent with the present disclosure substantially reduce test time of characterization target 120 using simultaneous capture of a large number of measurements in a single image. Embodiments as disclosed herein also provide camera system 150 (e.g., a CCD device) coupled to spectrometer system 160 in an imaging pipeline. Thus, the highly resolved 2-dimensional information of camera system 150 may be calibrated in real time with the highly resolved spectral information provided by spectroscopic system 160.

Figure 2:
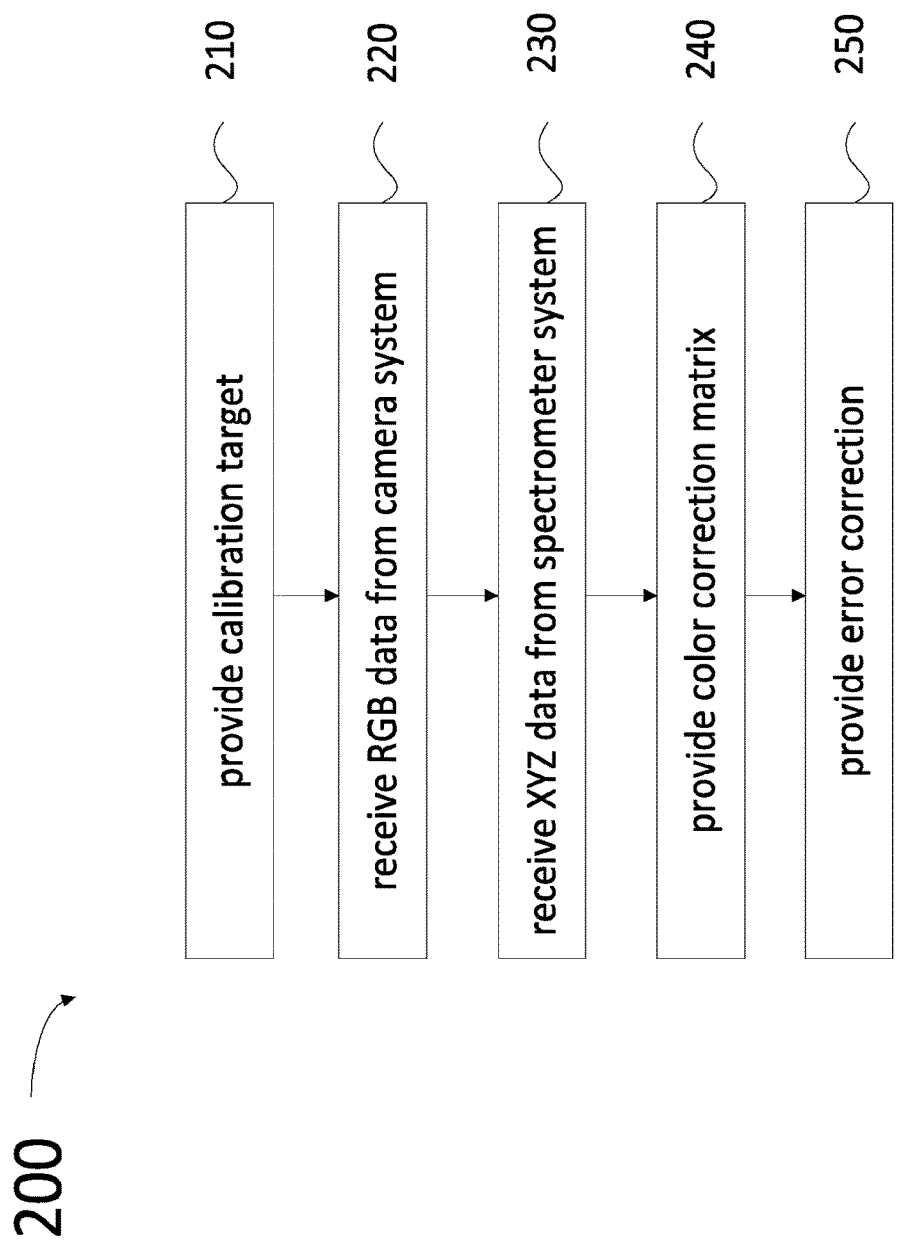
FIG. 2 illustrates a flow chart including steps in an imaging pipeline method, according to some embodiments.

FIG. 2 illustrates a flow chart including steps in an imaging pipeline method 200, according to some embodiments. Some steps in imaging pipeline method 200 may be applied in a production environment for display devices (e.g., a factory), using a 'golden' sample, for example once a month. In some embodiments, steps in imaging pipeline method 200 may be performed more frequently, such as for every display being tested. Some steps in imaging pipeline method 200 may be performed for each one of a plurality of images tested on each display. Steps in method 200 may be performed by a controller using data provided by a camera system and a spectrometer system (e.g., controller 170, camera system 150, and spectrometer 160, cf. FIG. 1). Accordingly, the data provided to the controller may be stored in a memory circuit and processed by a processor circuit in the camera system and, a memory circuit and a processor circuit in the spectrometer system (e.g., processor circuits 158 and 168, and memory circuits 159 and 169, cf. FIG. 1).

Step 210 includes providing a calibration target. In some embodiments, step 210 may include selecting a plurality of screen displays having standardized characteristics. For example, the plurality of screen displays may include a set of screens, each having a single, pre-determined color. In some embodiments selecting a plurality of screen displays may include selecting screen displays having spatial uniformity. For example, step 210 may include selecting a plurality of screen displays having a uniform intensity. Step 220 includes receiving RGB data from camera system 150. Step 230 includes receiving XYZ data from spectrometer system 160. The XYZ data received in step 230 may include a tristimulus vector determined by a highly resolved spectral analysis of incident light 110. Step 240 may include providing a color correction matrix (CCM). The CCM transforms RGB values provided by camera system 150 into device independent color space, such as CIE tristimulus vector XYZ. Step 250 includes providing an error correction to camera system 150 so that camera system may adjust the image settings. In some embodiments, steps 240 and 250 may include steps and procedures as described in detail below.

A. Development of Color Correction Matrix:

Since the spectral sensitivity functions of camera system 150 may not be identical to the CIE color matching function of human vision, the output responses of camera system 150 and the tristimulus values from spectrometer system 160 are related by a characterization model included in steps 240 and 250. For achieving high-fidelity color reproduction, the output RGB values from camera system 150 are transformed to CIE colorimetric values, such as XYZ or CIELAB. The model is developed based on two sets of data, colorimetric values (e.g., tristimulus vector XYZ) provided by spectrometer system 160 and camera responses (e.g., RGB output) from camera system 150. Accordingly, the colorimetric response and the camera responses are originated by a characterization target. For example, the characterization target may be characterization target 120. In some embodiments, a calibration method of an imaging pipeline may include characterization targets that are accurate colorimetric standards. Thus, a calibration process as in imaging pipeline method 200 may provide a reliable camera model that may be used in a display manufacturing environment.

The CCM in step 240 may be constructed by simultaneously measuring the RGB response of camera system 150 and the XYZ colorimetric values provided by spectrometer system 160 from a characterization target 120.

A.1 Camera Characterization Model:

Most characterization models are built by first measuring the characterization target on the media considered, and then generating the mathematical model to transform any color in the device color space to a particular color space. It is often possible to define the relationship between two color spaces through a 3 by 3 matrix. For example, $$\begin{bmatrix} X \\ Y \\ Z \end{bmatrix} = \begin{pmatrix} q_{1,1} & q_{1,2} & q_{1,3} \\ q_{2,1} & q_{2,2} & q_{2,3} \\ q_{3,1} & q_{3,2} & q_{3,3} \end{pmatrix} \begin{bmatrix} R \\ G \\ B \end{bmatrix} \qquad \text{Eq. 1}$$

where X, and Y and Z may be the CIE tristimulus values provided by spectrometer system 160. R, G and B are camera signals provided by camera system 150. However, when modeling many devices the 3 by 3 matrix does not yield a sufficiently accurate, a complex or non-linear model may be desirable.

With the purpose of display measurement, a polynomial model is established without any assumption of physical features of the associated device. It includes a series of coefficients, which is determined by regression from a set of known samples. The generic formula for the polynomial model is given in Eq. 2.

$$X = \sum_{0 \le i_R + i_G + i_B \le n_P} q_{x,i_R,i_G,i_B} R^{i_R} G^{i_G} B^{i_B} \qquad \text{Eq. 2}$$

$$Y = \sum_{0 \le i_R + i_G + i_B \le n_P} q_{y,i_R,i_G,i_B} R^{i_R} G^{i_G} B^{i_B}$$

$$Z = \sum_{0 \le i_R + i_G + i_B \le n_P} q_{z,i_R,i_G,i_B} R^{i_R} G^{i_G} B^{i_B}$$

where $i_R$, $i_G$ and $i_B$ are nonnegative integer indices representing the order of R, G and B camera response; $n_P$ is the order of the polynomial model; $q_{x,i_R,i_G,i_B}$, $q_{y,i_R,i_G,i_B}$, and $q_{z,i_R,i_G,i_B}$ are the model coefficients to be determined. When all of $i_R$, $i_G$ and $i_B$ are allowed to be zero, the constant coefficients will be included. When $n_P=1$, Eq. 2 becomes:

$$X = q_{x,0,0,0} + q_{x,1,0,0}R + q_{x,0,1,0}G + q_{x,0,0,1}B$$

$$Y = q_{y,0,0,0} + q_{y,1,0,0}R + q_{y,0,1,0}G + q_{y,0,0,1}B$$

$$Z = q_{z,0,0,0} + q_{z,1,0,0}R + q_{z,0,1,0}G + q_{z,0,0,1}B \qquad \text{Eq. 3}$$

and when $n_P=2$, Eq. 2 becomes:

$$X = q_{x,0,0,0} + q_{x,1,0,0}R + q_{x,0,1,0}G + q_{x,0,0,1}B + q_{x,2,0,0}R^2 + q_{x,0,2,0}G^2 + q_{x,0,0,2}B^2 + q_{x,1,1,0}RG + q_{x,1,0,1}RB + q_{x,0,1,1}GB$$

$$Y = q_{y,0,0,0} + q_{y,1,0,0}R + q_{y,0,1,0}G + q_{y,0,0,1}B + q_{y,2,0,0}R^2 + q_{y,0,2,0}G^2 + q_{y,0,0,2}B^2 + q_{y,1,1,0}RG + q_{y,1,0,1}RB + q_{y,0,1,1}GB$$

$$Z = q_{z,0,0,0} + q_{z,1,0,0}R + q_{z,0,1,0}G + q_{z,0,0,1}B + q_{z,2,0,0}R^2 + q_{z,0,2,0}G^2 + q_{z,0,0,2}B^2 + q_{z,1,1,0}RG + q_{z,1,0,1}RB + q_{z,0,1,1}GB \qquad \text{Eq. 4}$$

Eq. 1 can be expressed in matrix form as given in Eq. 5:

$$\vec{c} = Q\vec{a} \qquad \text{Eq. 5}$$

Thus, for nP=1, Q is a 3 by 4 matrix:

$$\vec{c} = \begin{pmatrix} X \\ Y \\ Z \end{pmatrix} \quad Q = \begin{pmatrix} q_{x,0,0,0} & q_{x,1,0,0} & q_{x,0,1,0} & q_{x,0,0,1} \\ q_{y,0,0,0} & q_{y,1,0,0} & q_{y,0,1,0} & q_{y,0,0,1} \\ q_{z,0,0,0} & q_{z,1,0,0} & q_{z,0,1,0} & q_{z,0,0,1} \end{pmatrix} \quad \vec{a} = \begin{pmatrix} 1 \\ R \\ G \\ B \end{pmatrix} \qquad \text{Eq. 6}$$

where $\bar{c}$ is a column vector of tristimulus values, Q is the polynomial mapping matrix, and $\vec{a}$ is a column vector formed by camera responses. For $n_P$ from 1, 2, 3, 4 to 5, all the sizes of the column vectors and together with the matrix Q are tabulated in Table 1.

TABLE 1

| Sizes of the matrix for polynomial models | | | |
| --- | --- | --- | --- |
| np | $\bar{c}$ | Q(3 × $N_P$) | $\bar{a}$ |
| 1 | 3 | 3 × 4 | 4 |
| 2 | 3 | 3 × 10 | 10 |
| 3 | 3 | 3 × 20 | 20 |
| 4 | 3 | 3 × 35 | 35 |
| 5 | 3 | 3 × 56 | 56 |

For characterizing digital camera by polynomial model, there are two steps:

1. To form vector $\vec{a}$ via the given camera RGB vector $\bar{o} = (R,G,B)^T$ 2. To transform $\vec{a}$ to the vector $\bar{c}$ of tristimulus values by the mapping matrix Q Note here the superscript T represents the transpose of vector or matrix. Since the polynomial model is established when the mapping matrix Q is defined, some training samples max be desirable.

Suppose K samples are available. For each sample, the camera response vector $\bar{o}$ can be obtained by imaging the sample using camera. The tristimulus values vector $\bar{c}$ can be also measured by physical measurement such as spectrophotometers. Hence there are K tristimulus values vectors: $\bar{c}_k$, k=1, 2, ..., K; and K camera response vectors: $\bar{o}_k$, k=1, 2, ..., K, form the K vectors $\vec{a}_k$, k=1, 2, ..., K. Then Eq. 5 can be expressed as:

$$\bar{c}_k = Q\vec{a}_k, \quad l=1,2,\ldots,K \qquad \text{Eq. 7}$$

where $\vec{a}_k$ is formed based on the camera response vector $\bar{o}_k$, Letting $$C = [\bar{c}_1, \bar{c}_2, \ldots, \bar{c}_K], \text{ and } A = [\vec{a}_1, \vec{a}_2, \ldots, \vec{a}_K] \qquad \text{Eq. 8}$$

results in matrix equation:

$$C = QA \qquad \text{Eq. 9}$$

where C is 3 by K matrix, Q is 3 by Np matrix and A is Np by K matrix. In the above matrix equation, matrix Q is unknown. Since both of the matrices C and Q have three rows.

Let, $\tilde{C}_j$, j=1, 2, 3, represents the three row vectors of the matrix C, and $\tilde{Q}_j$, j=1, 2, 3, are the three row vectors of the matrix Q. Thus, the matrix in Eq. 9 can be split to three linear systems of equations:

$$\tilde{C}_j = \tilde{Q}_j A \qquad \text{Eq. 10}$$

or $$\overline{c}_j = A^T \overline{q}_j \text{ with } \overline{c}_j = (\tilde{C}_j)^T, \overline{q}_j = (\tilde{Q}_j)^T, j=1,2,3 \qquad \text{Eq. 11}$$

Note that $\tilde{C}_j$ and $\tilde{Q}_j$ are K and Np row vectors, but $\overline{c}_j$ and $\overline{q}_j$ are K and Np column vectors.

When K>Np, the linear system of equation $\overline{c}_j = A^T \overline{q}_j$ will have no solution. If K<Np, the equation will have many solutions. In fact when K=Np, it may have unique solution, or many solutions or no solution depending on the conditions of the vector $\overline{c}_j$ and matrix $A^T$. In general, the least squares solution is required, which is formulated as minimizing the expression:

$$\|A_T \overline{q}_j - \overline{c}_j\|_2$$

Here $\|\overline{c}_j\|_2$ notes the 2-norm of the vector $\overline{c}_j$. The above solution can be calculated by $$\overline{c}_j = (A^T)^+ \overline{q}_j \qquad \text{Eq. 13}$$

where $(A^T)+$ is the generalized or pseudo-inverse of the matrix AT.

If K=Np and Eq. 13 has a unique solution, $(A^T)+$ becomes the normal inverse $(A^T)^{-1}$ of the matrix $A^T$. If the problem (Eq. 13) has many solutions, the above solution will become the minimum norm solution. Note also that $\overline{q}_j = (\tilde{Q}_j)^T$ in Eq. 12, thus after some algebraic manipulations the mapping Q is finally given by $$Q = CA^+ \qquad \text{Eq. 14}$$

The above K samples with known camera responses $\overline{o}_k$ and tristimulus values vectors $\overline{c}_k$ which are applied to compute the matrix Q are called the training datasets.

For example, when using an individual sample to determine matrix Q in Eq. 5, there are many matrices Q satisfying Eq. 5. Constraints such as the above normalization are desirable since the unknown model parameters are used as multipliers. It is desirable that these parameters be smaller in magnitude in order to reduce noise propagation and to prevent local oscillation in prediction. In some embodiments, a minimum norm used may be the square root of the sum of squared unknowns (elements in the Q matrix). In the proposed method, the pseudo or generalized inverse is defined in Eq. 14. Hence, regardless of the number of samples used, the matrix Q with minimum norm is obtained, resulting in a unique solution in each case.

Generally, a better mapping to the characterization target can be obtained by high-order polynomials which involves more terms in the matrix. However, their experimental results show that several particular terms used such as RGB (first order polynomial, white color) and 1 (zero order polynomial, black color) can provide a more accurate prediction.

A.2 Development of Camera Characterization Target Based on Display Images:

Generally, when more colors are included in characterization target 120, the model can predict with better accuracy until the model performance stabilizes. A large number of colors may increase production costs in terms of testing time and complexity, while increasing the accuracy of the color rendition of camera system 150. Accordingly, embodiments consistent with the present disclosure provide an optimized set of display colors to construct characterization target 120 with reduced impact in testing time and complexity, while maximizing colorimetric accuracy.

Figure 3:
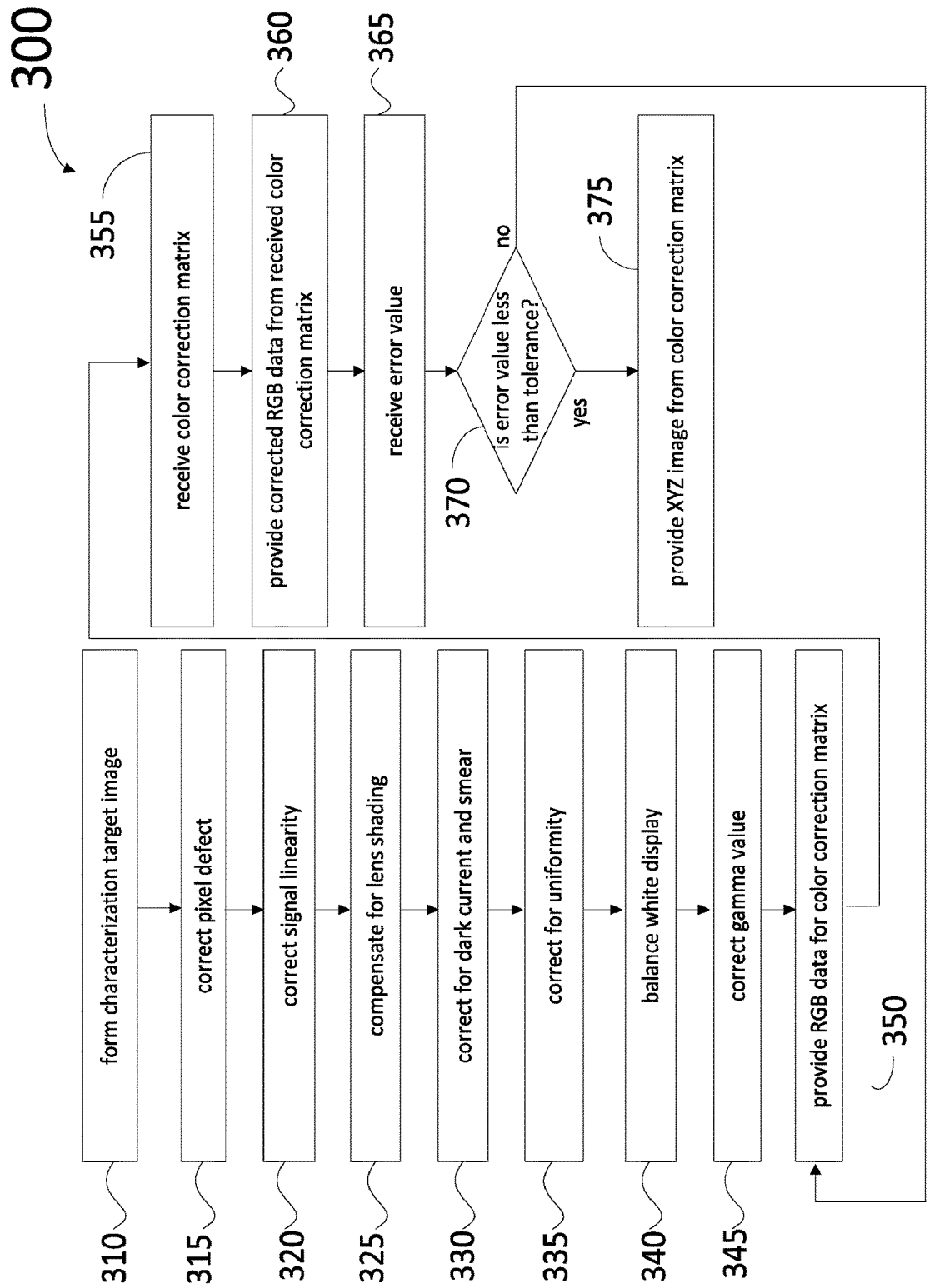
FIG. 3 illustrates a flow chart including steps in an imaging pipeline method, according to some embodiments.

FIG. 3 illustrates a flow chart including steps in an imaging pipeline method 300, according to some embodiments. Steps in method 300 may be performed by a controller using data provided by a camera system and a spectrometer system (e.g., controller 170, camera system 150, and spectrometer 160, cf. FIG. 1). Accordingly, the data provided to the controller may be stored in a memory circuit and processed by a processor circuit in the camera system and, a memory circuit and a processor circuit in the spectrometer system (e.g., processor circuits 158 and 168, and memory circuits 159 and 169, cf. FIG. 1).

The image quality of camera system 150 can significantly vary with the method of each step in image-processing pipeline. In camera system 150, the image pipeline involves exposure time determination, defective pixel correction, linearization, dark current removal, uniform correction, spatial demosaicing, display area detection, clipping algorithm and binning. Since the aim is to accurately correlate camera response to spectrometer and be able to detect display artifacts, the effect of the exposure time, linearization, dark current removal, uniform correction and clipping algorithm on image quality is fully studied. Imaging pipeline method 300 may include a calibration of camera system 150. Step 310 includes forming an image from characterization target 120. Step 315 includes correcting defect pixels. The defect pixels may be included in the 2D sensor array of camera 155 (cf. FIG. 1). Step 320 may include correcting signal linearity. Step 325 may include compensating for lens shading effects.

Step 330 includes correcting for dark current and smear in the sensor array of camera system 150.

B.31 Dark Current Removal:

Each image is obtained with dark current removal and uniformity correction. The camera dark current is measured with no ambient light by 10 times, we get the average RGB reading values after 10 times measurements:

TABLE 1

Camera dark current in R, G, and B channels

|  | R | G | B |
| --- | --- | --- | --- |
| Dark Current | 0.424042 | 0.4193533 | 0.4701065 |

The CC chart is applied as a characterization target as a benchmark for the system to build a 3 by 3 CCM using least-square regression. An evaluation of the CCM derived from the data with or without dark current removal is shown in Tables 2(a) and (b), respectively. The differences are as small as sub-0.1 range.

TABLE 2

CCM derived from the 24 GretagMacbeth ColorChecker chart (a) with and (b) without dark current removal

| (a) | | |
| --- | --- | --- |
| 3.6417 | 2.3073 | 0.4027 |
| 1.0473 | 5.9733 | −0.7247 |
| −0.0341 | −1.2831 | 5.9315 |

TABLE 2-continued

CCM derived from the 24 GretagMacbeth ColorChecker
chart (a) with and (b) without dark current removal

| (b) | | |
|---|---|---|
| 3.5314 | 2.3792 | 0.3478 |
| 0.94161 | 6.042 | −0.7775 |
| −0.1289 | −1.2208 | 5.8851 |

The results with and without removing dark current are shown in Tables 3 (a) and (b), respectively. The CIEDE2000 color differences are used as the metric to determine training and testing performance. The training performance is the model trained and tested by the Color Correction (CC) chart. The testing performance is the model trained by CC chart and tested by the 729 dataset. It can be seen that the average performance was slightly improved by 0.2 E00 units when we remove the dark current.

TABLE 3

Training and testing performance of the CCM
(a) with and (b) without dark current removal

| E00 | min | mean | median | max |
|---|---|---|---|---|
| (a) | | | | |
| Training performance | 0.222524 | 1.595685 | 0.855206 | 10.516312 |
| Testing performance | 0.039123 | 1.158254 | 0.616609 | 17.589503 |
| (b) | | | | |
| Training performance | 0.257385 | 1.746228 | 1.04665 | 9.943352 |
| Testing performance | 0.033203 | 1.339187 | 0.766321 | 16.974136 |

Step 335 may include correct uniformity in the 2D image provided by the sensor array in camera system 150. For example, step 335 may include correct of Mura and Moire artifacts in the image. When the lines in the display happen to line up closely with some of the lines of CCD sensor, the Moire patterns will occur an interference pattern. An optical low pass filter or a digital filter may be used to remove the artifacts. Accordingly, in some embodiment step 335 may include correction of artifacts resulting from a larger field of view of camera 155 relative to characterization target 120. An algorithm to detect the points of interest (POI) (the portion of a sensor array including light 110 from characterization target 120) may crop the area from a full camera view. Since, the display testing patterns are uniform colors, a technique of edge detection is used. A measure of edge strength such as gradient magnitude is derived for searching local directional maxima magnitude. Based on the magnitude, a threshold is applied to decide whether edges are present of not at an image point. The higher the threshold, the more edges will be removed.

Step 340 may include balancing a white display. Accordingly, step 345 may include presenting a standard 'white' characterization target 120 and determine the RGB camera output. Step 345 may include correct the gamma value of camera system 150. Step 350 may include providing RGB data for a color correction matrix step. Accordingly, step 350 may include providing RGB data after steps 310 through 345 are completed, to controller 170. Controller 170 may then form CCM matrix executing step 240 (cf. FIG. 2). Step 355 includes receiving a CCM. For example, step 355 may include processor circuit 158 receiving CCM from controller 170 when step 240 is complete (cf. FIG. 2). Step 360 includes providing corrected RGB data from the received CCM. Accordingly, step 360 may include receiving tristimulus data XYZ together with CCM, so that processor circuit 158 may obtain the corrected RGB values. In some embodiments processor circuit 158 may receive corrected RGB values directly from controller 170. Step 365 includes receiving an error value. The error value may be a difference between the RGB data provided in step 350 and the corrected RGB data provided in step 360. In step 370 processor circuit 158 determines whether or not the error value is below or above a tolerance value. When the error value is below the tolerance, then step 375 includes obtaining a tristimulus XYZ image from the CCM and the corrected RGB data. Accordingly, the XYZ image provided in step 375 may have a high colorimetric accuracy since it uses data provided by a high resolution spectrometer system 160 and a controller 170 forming a CCM as in step 240 (cf. FIG. 2 and Eqs. 1-14 above). When the error value is above tolerance then imaging pipeline method 300 is repeated from step 350.

Figure 4:
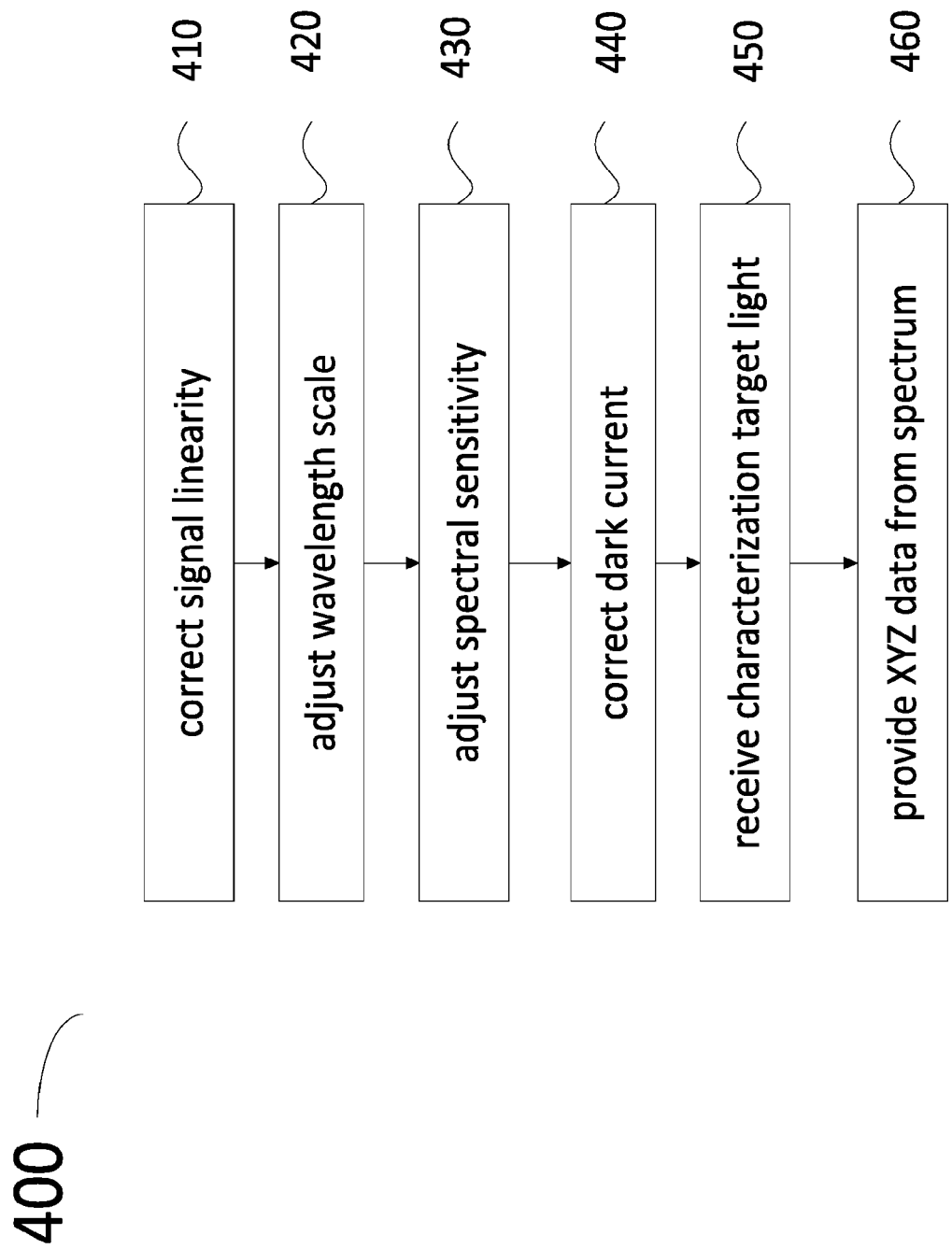
FIG. 4 illustrates a flow chart including steps in an imaging pipeline method, according to some embodiments.

FIG. 4 illustrates a flow chart including steps in an imaging pipeline method 400, according to some embodiments. Steps in method 400 may be performed by a controller using data provided by a camera system and a spectrometer system (e.g., controller 170, camera system 150, and spectrometer 160, cf. FIG. 1). Accordingly, the data provided to the controller may be stored in a memory circuit and processed by a processor circuit in the camera system and, a memory circuit and a processor circuit in the spectrometer system (e.g., processor circuits 158 and 168, and memory circuits 159 and 169, cf. FIG. 1).

Imaging pipeline method 400 may include a calibration of spectrometer system 160. Step 410 may include correcting a signal linearity. For example, the signal linearity may be the linearity of sensor array 165 (cf. FIG. 1). In some embodiments, step 410 is performed by providing a uniform light source to spectrometer system 160. Step 420 may include adjusting a wavelength scale. Step 430 may include adjusting the spectral sensitivity. Step 440 may include correcting for a dark current. The dark level error may be caused by the imperfect glass trap and specular beam error. Thus, step 440 may include placing a glass wedge in the optical path of spectrometer system 160. Step 450 may include receiving a characterization target light. And step 460 may include providing XYZ data from the spectrum formed with the received characterization light.

Figure 5:
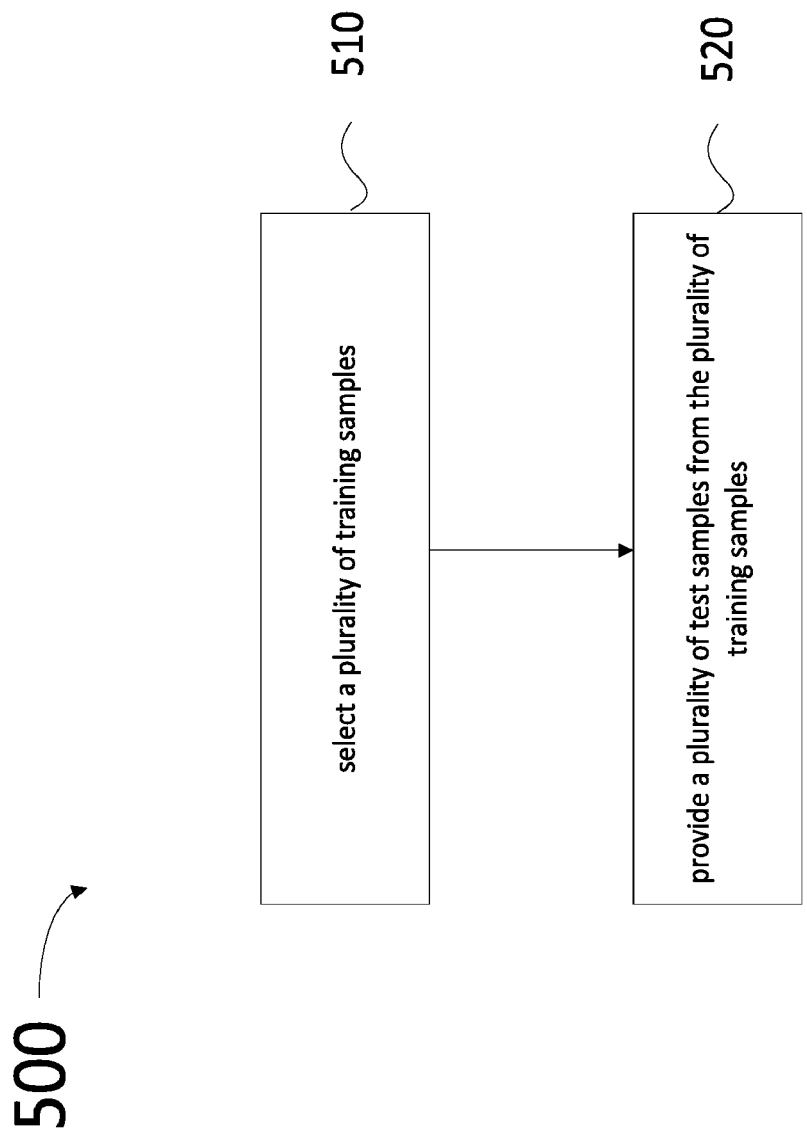
FIG. 5 illustrates a flow chart including steps in an imaging pipeline calibration method, according to some embodiments.

FIG. 5 illustrates a flow chart including steps in an imaging pipeline calibration method 500, according to some embodiments. Steps in method 500 may be performed by a controller using data provided by a camera system and a spectrometer system (e.g., controller 170, camera system 150, and spectrometer 160, cf. FIG. 1). Accordingly, the data provided to the controller may be stored in a memory circuit and processed by a processor circuit in the camera system and, a memory circuit and a processor circuit in the spectrometer system (e.g., processor circuits 158 and 168, and memory circuits 159 and 169 cf. FIG. 1).

Step 510 includes selecting a plurality of training samples. Step 510 may include selecting a plurality of colors from a standard, or a 'gold' standard. Step 520 includes providing a plurality of test samples from the plurality of training samples selected in step 510. Accordingly, step 520 may include digitally processing the training samples provided in step 510 to generate a larger number of test samples. A plurality of training samples as selected in step 510 may be as described in detail below, with reference to FIGS. 6A and 6B. In one example, training samples 610 may be obtained from a well-known standard chart. The Color- Checker® Color Rendition Chart supplied by Macbeth Company in 1976 is now called ColorChecker® (CC) owned by X-Rite. It has been widely used as reference in the field of photography and video. The chart includes a matrix of 24 scientifically prepared color squares including three additive and three subtractive primaries, 6 greyscale tones, and natural color objects such as foliage, human skin and blue sky which exemplify the color of their counterparts. These 24 colors are reproduced on the testing display as characterization target 120.

Figure 6B:
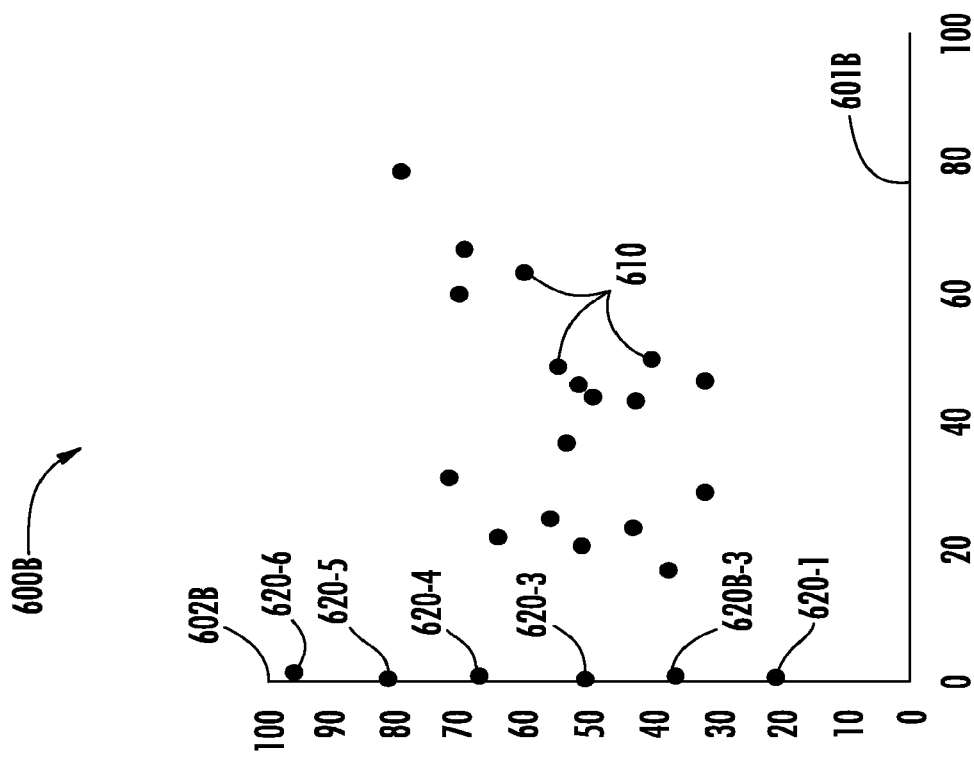
FIG. 6B illustrates a color distribution chart for a plurality of training samples in an imaging pipeline calibration method, according to some embodiments.
Figure 6A:
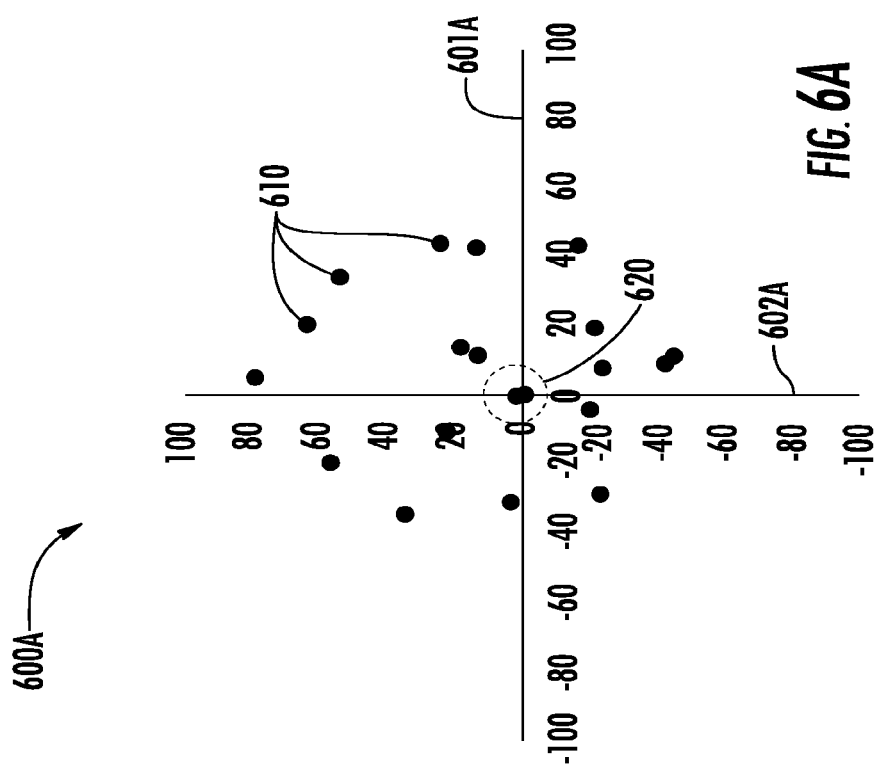
FIG. 6A illustrates a color distribution chart for a plurality of training samples in an imaging pipeline calibration method, according to some embodiments.

FIG. 6A illustrates a color distribution chart 600A for a plurality of training samples 610 in an imaging pipeline calibration method, according to some embodiments. FIG. 6A shows the color distribution of the CC on a*b* planes. Accordingly, the abscissa 601A in chart 600A corresponds to the a* value (red-green scale), and the ordinate 602A in chart 600A corresponds to the b* value (yellow-blue scale). The CC chart may include a set of gray scale colors 620 that are displayed in the origin of chart 600A (neutral color).

The greyscale of CC chart can be applied to correct the linearity between luminance level and camera response. Once the camera has been characterized, the greyscale is also used to check the gamma of the testing display (e.g., in step 345, cf. FIG. 3).

FIG. 6B illustrates a color distribution chart 600B for the plurality of training samples 610 in an imaging pipeline calibration method, according to some embodiments. FIG. 6B shows the color distribution of the CC on L*-C*ab planes. Accordingly, the abscissa 601B in chart 600B corresponds to the Ca*b* value ($\sqrt{a^{*2}+b^{*2}}$), and the ordinate 602B in chart 600B corresponds to the L* value (luminance). Test samples 610 in may include a set 620 of gray scale colors that are displayed along the 602B axis at regular intervals (evenly graded 'lightness').

A plurality of test samples as used in method 500 (cf. FIG. 5 above) may be as described in detail with respect to FIGS. 7A and 7B, below. In FIG. 7A the abscissa 701A and ordinate 702A may be as in FIG. 6A. And in FIG. 7B the abscissa 701B and ordinate 701B may be as in FIG. 6B.

FIG. 7A illustrates a color distribution chart 700A for a plurality of test samples 710 in an imaging pipeline calibration method, according to some embodiments. Accordingly, test samples may include 729 uniform distribution colors on display color gamut. One of ordinary skill will recognize that there is nothing limiting with regard to the number of data points in test sample 710.

The test colors 710 are formed from training colors 610 using 16 bits intervals along red, green and blue channels plus a grey scale are accumulated to have 729 colors. These colors uniformly distribute in the display color gamut as shown in FIGS. 7A and 7B.

Figure 7B:
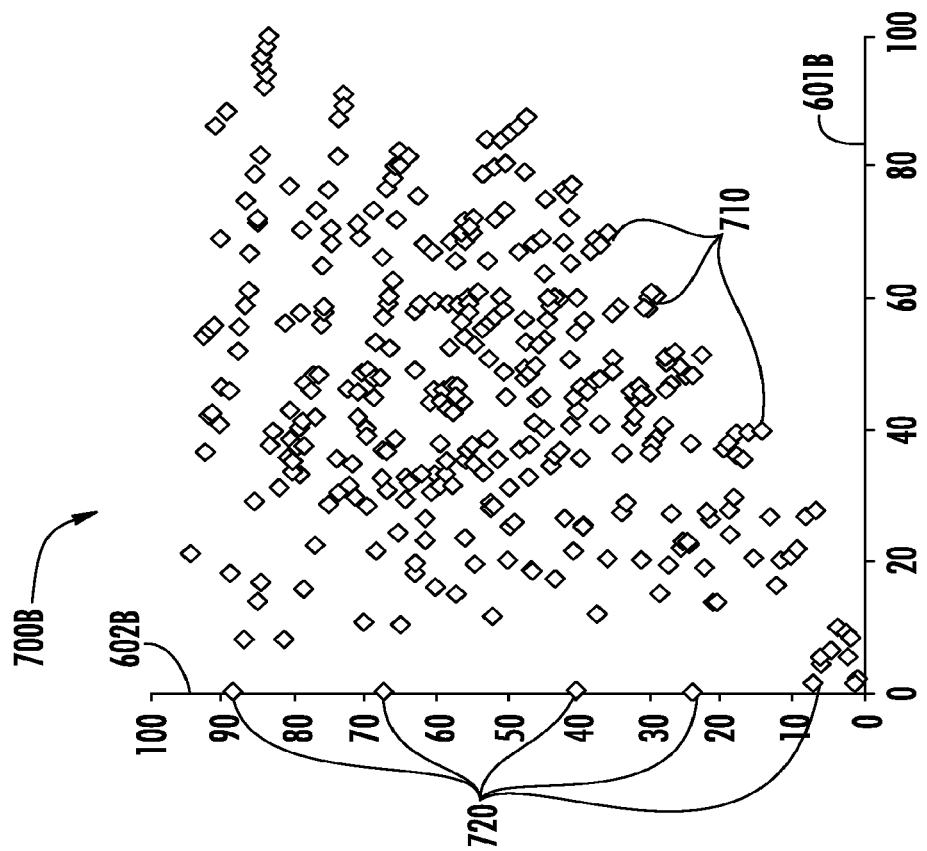
FIG. 7B illustrates a color distribution chart for a plurality of test samples in an imaging pipeline calibration method, according to some embodiments.
Figure 7A:
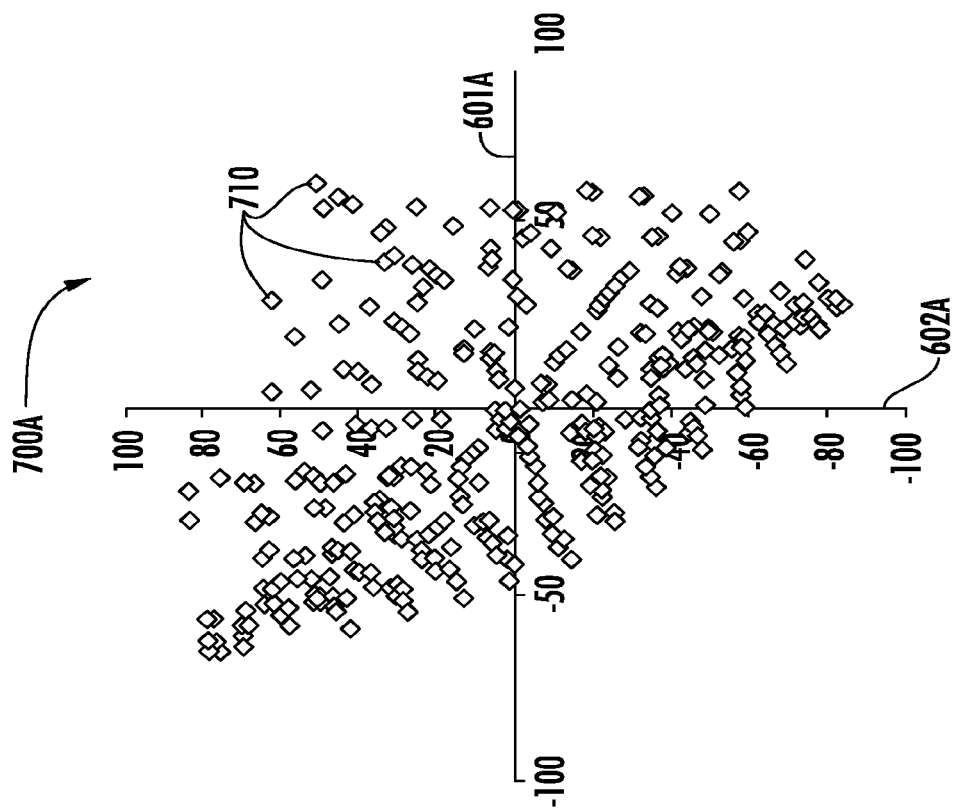
FIG. 7A illustrates a color distribution chart for a plurality of test samples in an imaging pipeline calibration method, according to some embodiments.

FIG. 7B illustrates a color distribution chart 700B for a plurality of test samples 710 in an imaging pipeline calibration method, according to some embodiments. Test samples 710 may include gray scale samples 720. Chart 700B shows an L*-Ca*b* plane, so that gay scale points 720 are clearly distinguishable along the L* axis (ordinates).

Based on test sample set 710, a color selection algorithm is applied to select colors to establish a characterization target for display measurement. This set is also applied to test the robustness of characterization targets.

Figure 8:
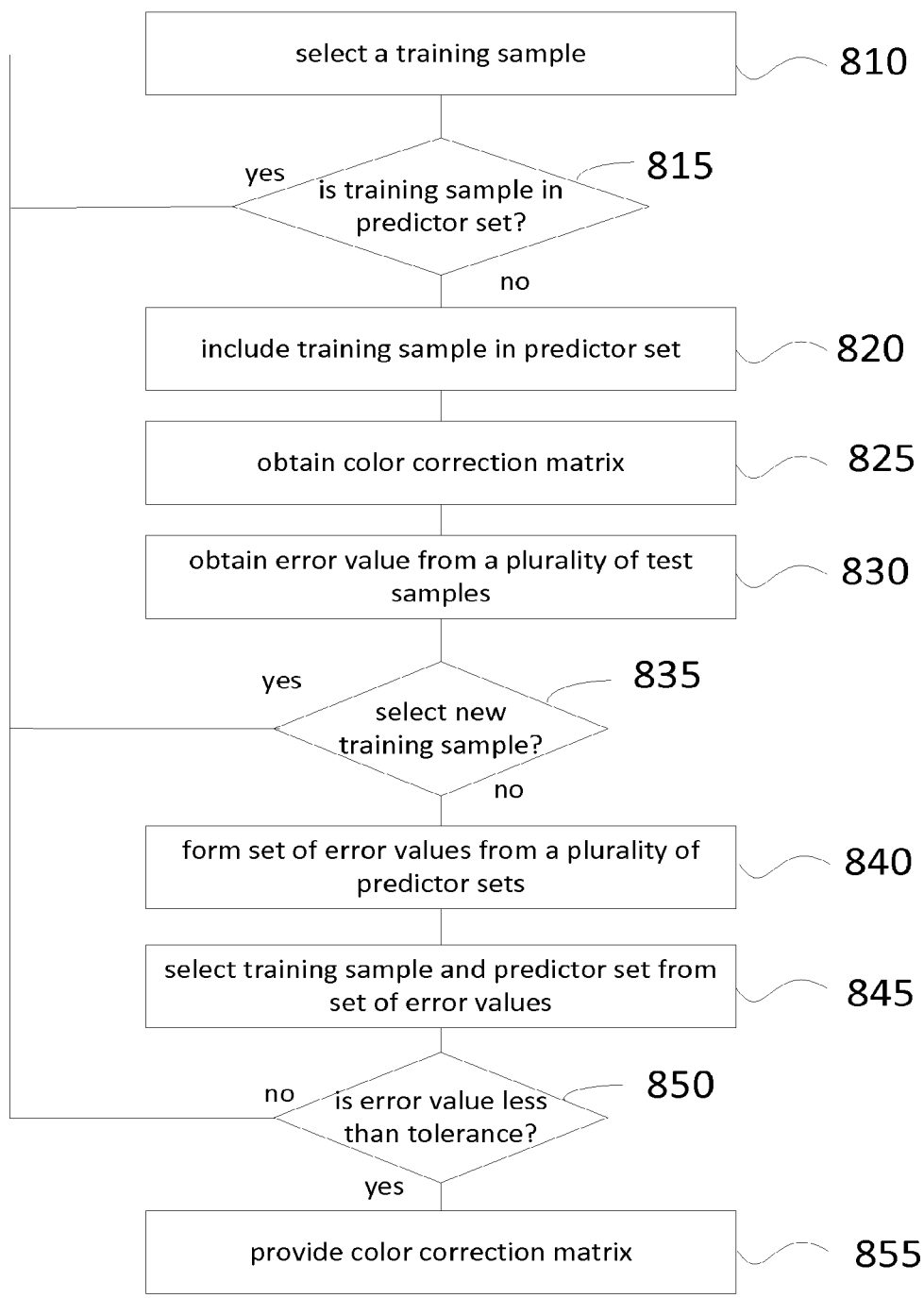
FIG. 8 illustrates a flow chart including steps in a color selection algorithm used for an imaging pipeline calibration method, according to some embodiments.

FIG. 8 illustrates a flow chart including steps in a color selection algorithm 800 used for an imaging pipeline calibration method, according to some embodiments. Algorithm 800 may include a color selection algorithm (CSA) to achieve high color accuracy in terms of color differences. In other words, CSA 800 may achieve high color resolution. During the selection process, a source dataset including XYZ and camera RGB are first provided (see vectors c and a, in reference to step 240 in method 200, cf. FIG. 2). The number of samples in the source dataset and the training dataset, which are the samples selected from the source dataset are known. Steps in method 800 may be performed by a controller using data provided by a camera system and a spectrometer system (e.g., controller 170, camera system 150, and spectrometer 160, cf. FIG. 1). Accordingly, the data provided to the controller may be stored in a memory circuit and processed by a processor circuit in the camera system and, a memory circuit and a processor circuit in the spectrometer system (e.g., processor circuits 158 and 168, and memory circuits 159 and 169, cf. FIG. 1).

Step 810 includes collecting a training sample. Accordingly, step 810 may include selecting a training set from a standardized set. The standardized set may be a set of calibration colors. If K is the total number of samples in a training set, a value κ may be predefined as the number of training samples to form a predictor set. Thus, κ may be a 'dimension' of the predictor set. In some embodiments, method 800 starts with κ equal to zero. Since there are K training samples, each sample is a candidate. Each of the K samples is first used (κ=0) to obtain a predictor set. Thus, K models are obtained. Step 815 includes a query as to whether or not the training sample is already included in a predictor set. If the training sample is already included in the predictor set, then method 800 starts again with a new training sample, to form a new predictor set. A predictor set may include matrices C and $A^T$, including vectors c and a (cf. the detailed description of step 240 in method 200, FIG. 2). Thus, the predictor set may include tristimulus values (XYZ, vector c) from spectrometer system 160, and RGB values from camera system 150 (vector a, formed from RGB values according to Eq. 2). When the training sample is not included in the predictor set, step 820 includes the training sample into the predictor set. In some embodiments, the predictor set may be empty, so that the first training sample selected in set 810 may automatically be used in the predictor set. In step 825 a CCM is obtained using the predictor set. Accordingly, the CCM may be formed as matrix Q, from matrices C and A (cf. Eq. 14). Step 830 includes obtaining an error value from a plurality of test samples. For example, step 830 may include obtaining RGB values for a plurality of test samples obtained with the tristimulus values XYZ provided by spectrometer system 160 and the CCM matrix Q. Step 830 may further include comparing the obtained RGB values with the RGB values provided by camera system 150 for each test sample.

The set of test samples used in step 830 may be much larger than the set of training samples used to form the predictor set. For example, the set of training samples in steps 810 through 825 may be as training set 610 (cf. FIGS. 6A and 6B). And the set of test samples in step 830 may be as test set 710 (cf. FIGS. 7A and 7B). Step 830 may include obtaining a single error value from a set of error values for each of the test samples. In some embodiments step 830 may include averaging the error values from the set of error values for each of the test samples. In some embodiments, step 830 may include selecting an error value from a statistical distribution of the error values for all the test samples. For example, a median, a mean, the maximum, or the minimum error values in a distribution of error values may be selected in step 830. Step 835 includes querying whether or not a new training sample is selected. For example, if a training sample remains to be selected then steps 810 through 835 are repeated until the result in step 835 is a 'no.' In some embodiments, step 835 may produce a 'no' when all training samples in the set of training samples have been selected or included in a predictor set. Accordingly, up to step 835 a plurality of predictor sets is selected, each predictor set having the same number of c vectors and a vectors (κ+1). Moreover, each predictor set up to step 835 includes a same set of κc vectors and κa vectors, except the c vector and a vector selected in the last iteration of steps 810 through 835. Also, within a single predictor set, all (κ+1) vectors c may be different from one another, and all (κ+1) vectors a may be different from one another. Thus, up to step 835 an error value is assigned to each one of a predictor set associated with each selected training sample.

When step 835 results in a 'no' answer, then step 840 includes forming a set of error values from the plurality of predictor sets. Step 845 includes selecting a training sample and a predictor set from the set of error values. Accordingly, step 845 includes selecting the training sample that provides the lowest error in the set of error values formed in step 840. If the error value of the selected predictor set is less than a tolerance value according to step 850, then the predictor set is used to form the CCM matrix in step 855. Accordingly, step 855 may include forming matrix Q using the (κ+1) c vectors and the (κ+1) a vectors from the selected predictor set as in Eq. 14. If the error value of the selected predictor set is greater than or equal to the tolerance value according to step 850, then method 800 may be repeated from step 810. The dimension of the predictor set is then increased by one (1).

For example, the second iteration of steps 810 through 845 should provide the best combination of 2 c vectors and a vectors for a predictor set. In order to avoid selecting 2 same c vectors or 2 same a vectors, the previously selected training sample c vector and a vector is removed from the source dataset and κ equals to one (1). Once again, each remaining training sample combined with the already selected training sample is used for training the model in steps 810 through 845. Thus, in a second iteration, the number of predictor sets in step 840 will be K−1 models. Again, each predictor set is used to predict the full source dataset. From the predictions, the sample combined with already selected training sample with the smallest color difference will be selected.

Accordingly, method 800 may be repeated until it reaches a number of training samples producing an error lower than the threshold. This CSA is simple and easy to implement. According to some embodiments a predictor set having a single element may include the lightest neutral color in the training set, with a mean error value (ΔE00) of about 15. Thus, in some embodiments it is desirable that the lightest neutral color be included in the training set.

Figure 9A:
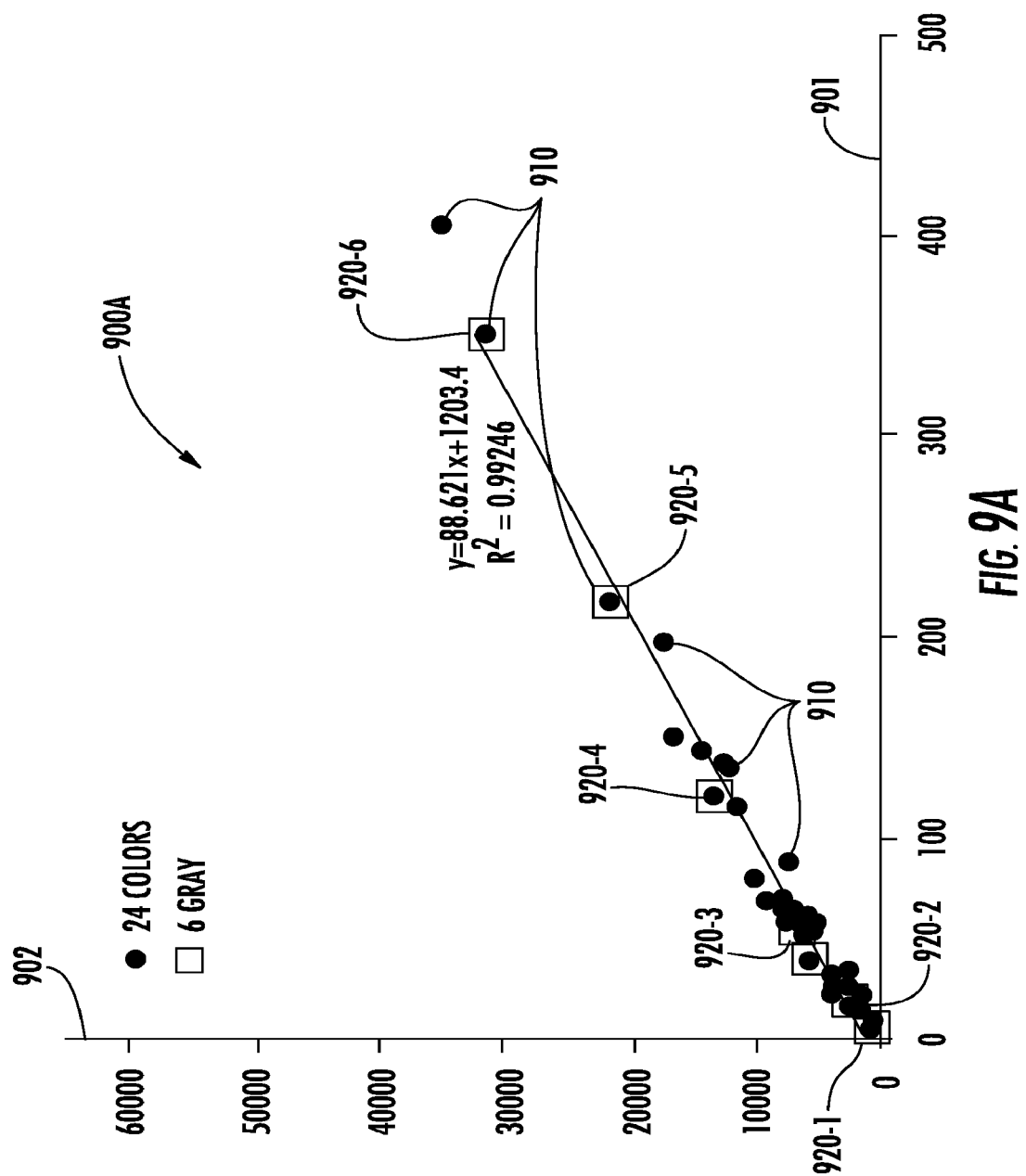
FIG. 9A illustrates a camera system response chart for a signal linearity correction step in an imaging pipeline calibration method, according to some embodiments.

FIG. 9A illustrates a camera system response chart 900A for a signal linearity correction step in an imaging pipeline calibration method, according to some embodiments. Chart 900A may be the result of step 320 in imaging pipeline method 300 (cf. FIG. 3). Abscissa 901 in chart 900A may be associated to a tristimulus XYZ vector provided by spectrometer system 160, such as luminance L*, or a Y coordinate. Ordinate 902 in chart 900A may be associated to an RGB data from camera system 150, such as the 'Green' count, 'G.' Data points 910 may be associated to each training sample in a set of training samples (e.g., training samples 610, cf. FIGS. 6A and 6B). Data points 910 may also comprise gray scale data points 920-1, 920-2, 920-3, 920-4, 920-5, and 920-6. To correct for signal linearity, the exposure time of camera 155 in camera system 150 may be adjusted, as follows. Chart 900A is associated with a fixed exposure time scenario. In particular the exposure time may be a few milliseconds, such as less than 10, 10, 20, 24, or even more milliseconds.

In order to have sufficient image quality to detect display effect, the exposure time should be controlled by signal to noise ratio (SNR) of an image. Fixed exposure time for all measurements keeps the linearity between camera response and colors which is desirable for CCM development. Accordingly, it may be desirable to avoid SNR fluctuations with different color pattern, especially for a dark characterization target 120. Using a fixed exposure time may include ensuring that test colors are within the dynamic range of camera system 150.

Figure 9B:
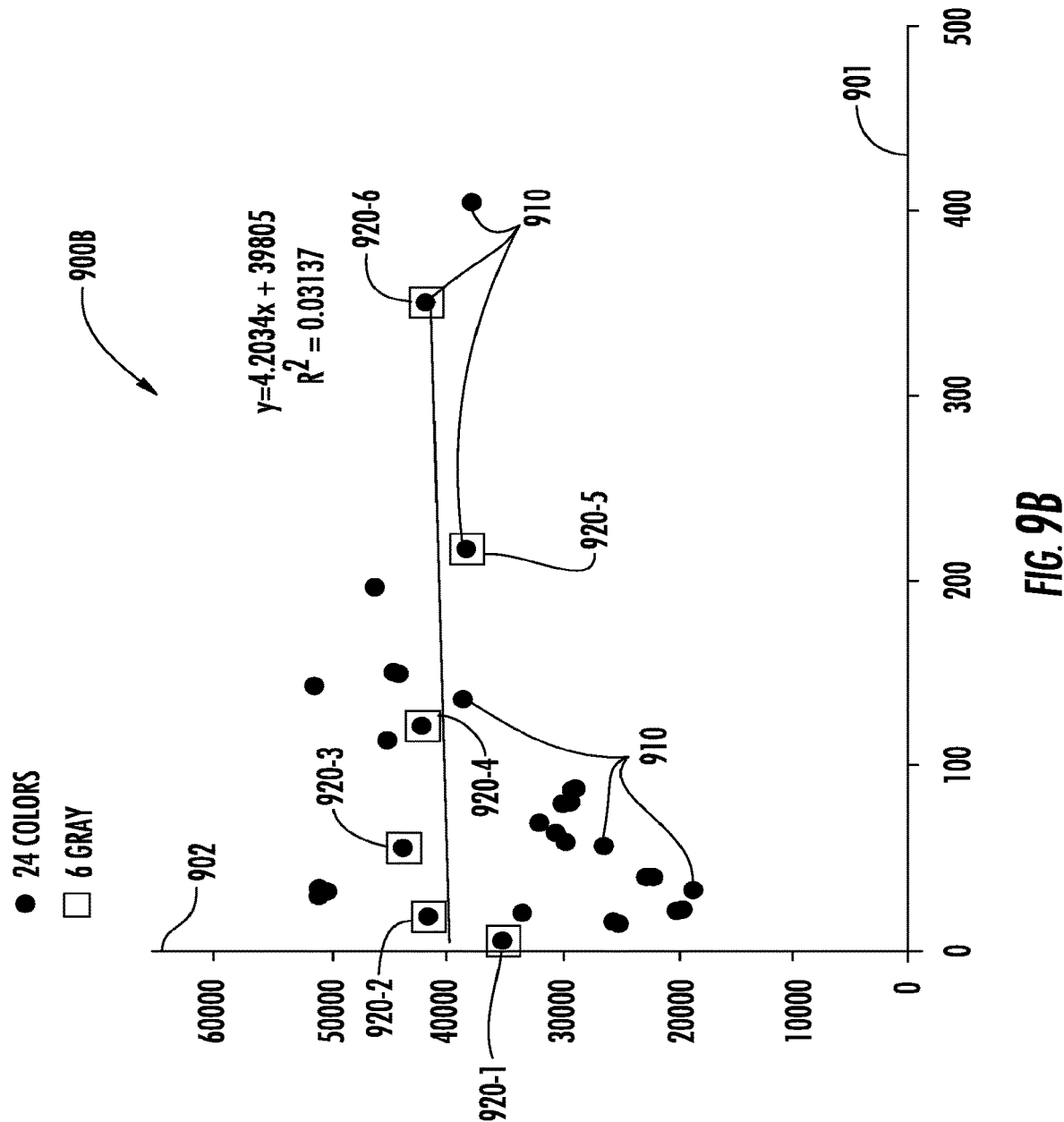
FIG. 9B illustrates a camera system response chart for a signal linearity correction step in an imaging pipeline calibration method, according to some embodiments.

FIG. 9B illustrates a camera system response chart 900B for a signal linearity correction step in an imaging pipeline calibration method, according to some embodiments. Ordinates 901, abscissae 902, and data points 910 and 920 in chart 900B are as in chart 900A, described above. Chart 900B includes a configuration wherein the exposure time in camera 155 is set in auto-exposure mode. The auto-exposure setting ensures images with high SNR. However, chart 900B shows that camera linearity to color stimulus will be lower than fixed exposure setting (chart 900A). A configuration of camera system 150 as described in chart 900B may be desirable to increase the average camera signal. Accordingly, a signal level from about 40000 to 65535 may be obtained for some test samples, rendering higher average SNR as in chart 900A.

Figure 9C:
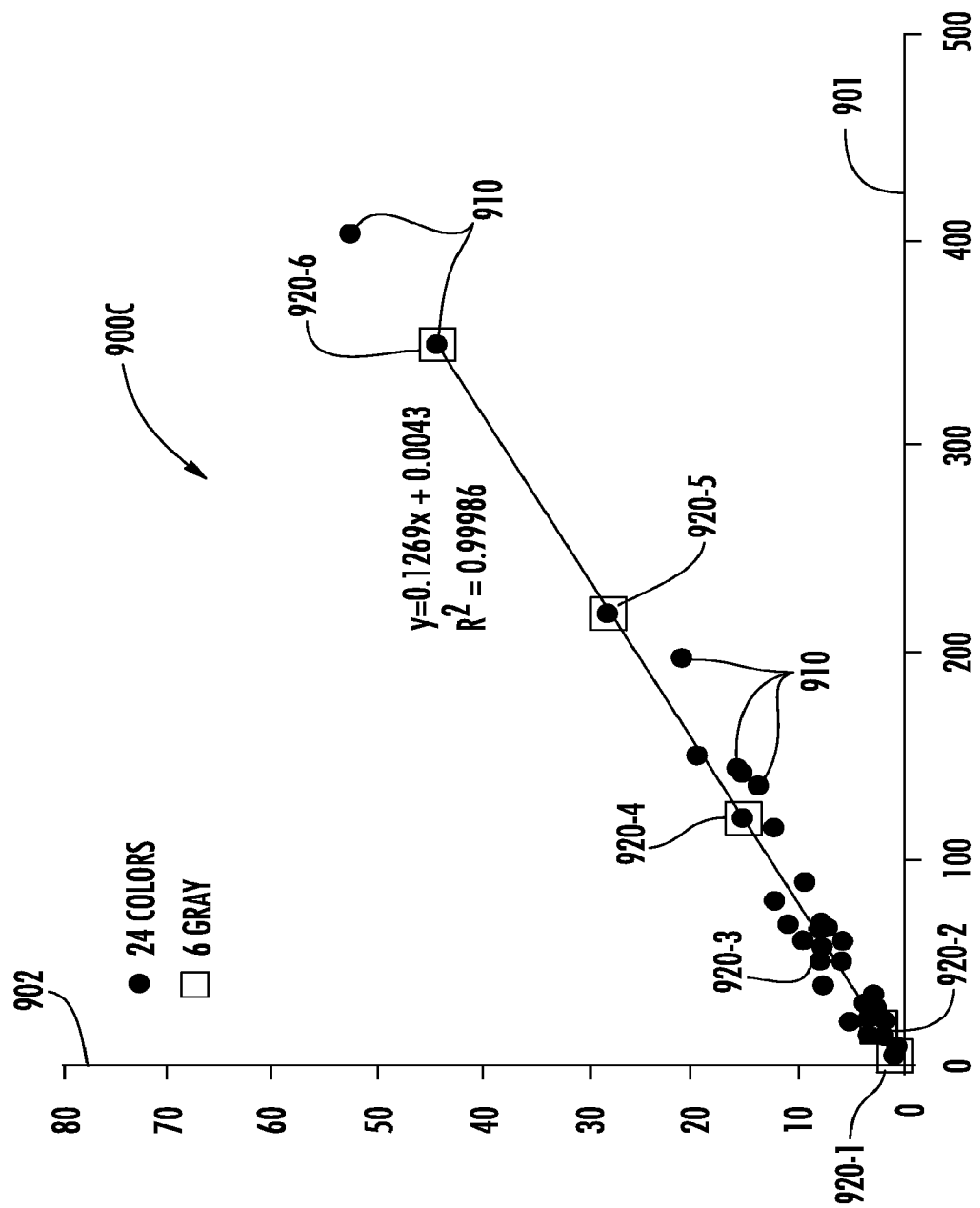
FIG. 9C illustrates a camera system response chart for a signal linearity correction step in an imaging pipeline calibration method, according to some embodiments.

FIG. 9C illustrates a camera system response chart 900C for a signal linearity correction step in an imaging pipeline calibration method, according to some embodiments. Ordinates 901, abscissae 902, and data points 910 and 920 in chart 900B are as in charts 900A and 900B, described above. Chart 900C includes a configuration wherein the exposure time in camera 155 is set in auto-exposure mode. Further, in the configuration illustrated in FIG. 9C the output from camera system 150 (ordinate 902) is normalized by the exposure time. Chart 900C illustrates that in order to correct signal linearity (e.g., in step 320, method 300, cf. FIG. 3), the camera output may be normalized with the exposure time. The camera RGB responses in FIGS. 9A-9C are measured for a set of achromatic samples, a uniform white and the dark condition.

Figure 10:
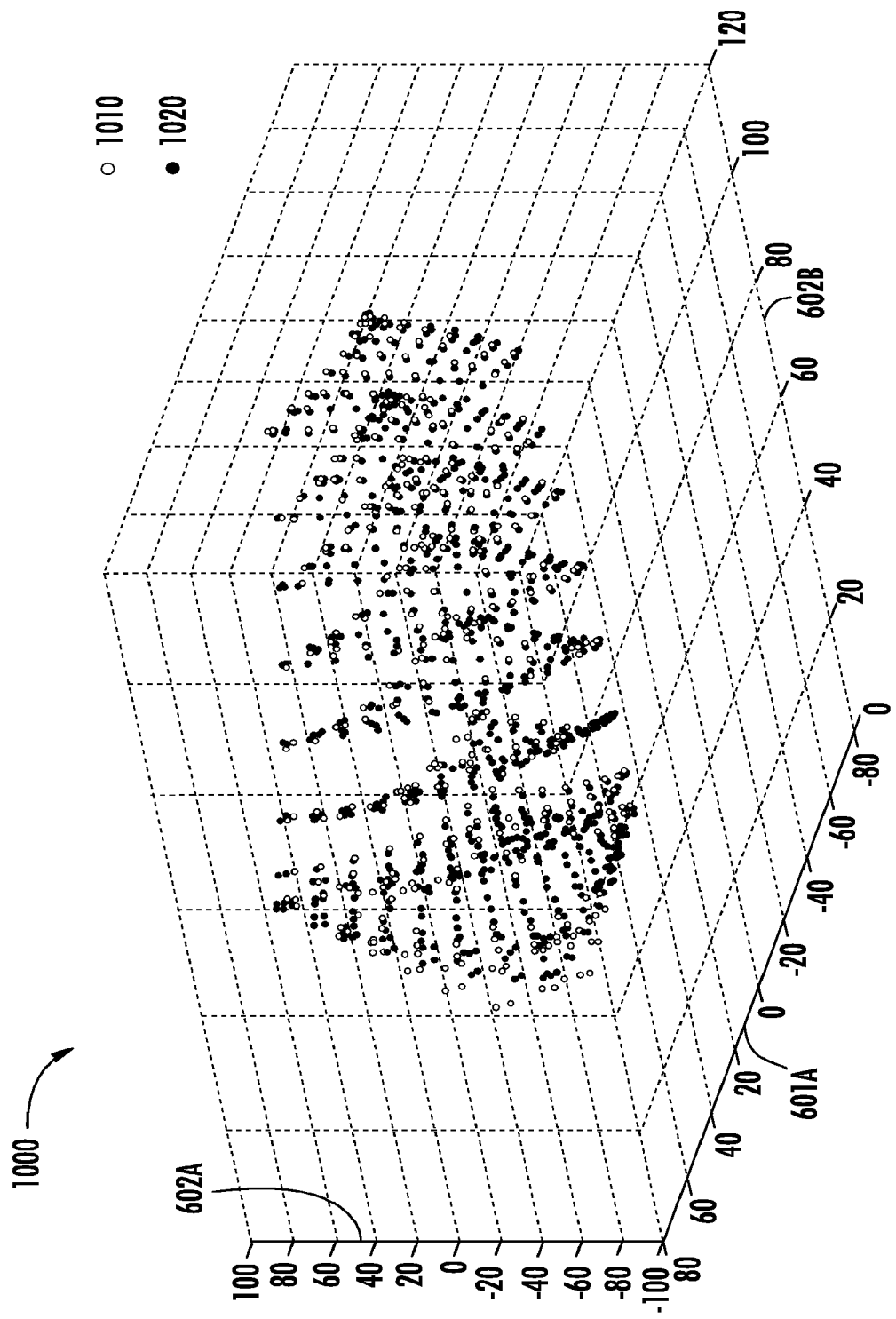
FIG. 10 illustrates a color distribution chart for a plurality of test samples measured and predicted in an imaging pipeline calibration method, according to some embodiments.

FIG. 10 illustrates a color distribution chart 1000 for a plurality of test samples measured 1010, and predicted 1020, in an imaging pipeline calibration method, according to some embodiments. Chart 1000 has an abscissa 601A, an ordinate 602A, and a depth axis 602B, as defined above with respect to FIGS. 6A and 6B. A training sample of 24 colors was used (cf. FIGS. 6A and 6B) to select a preferred predictor set according to method 800 (cf. FIG. 8). A test sample of 729 colors (cf. FIGS. 7A and 7B) is shown in FIG. 10. It can be seen that larger errors occur in the dark region.

Figure 11:
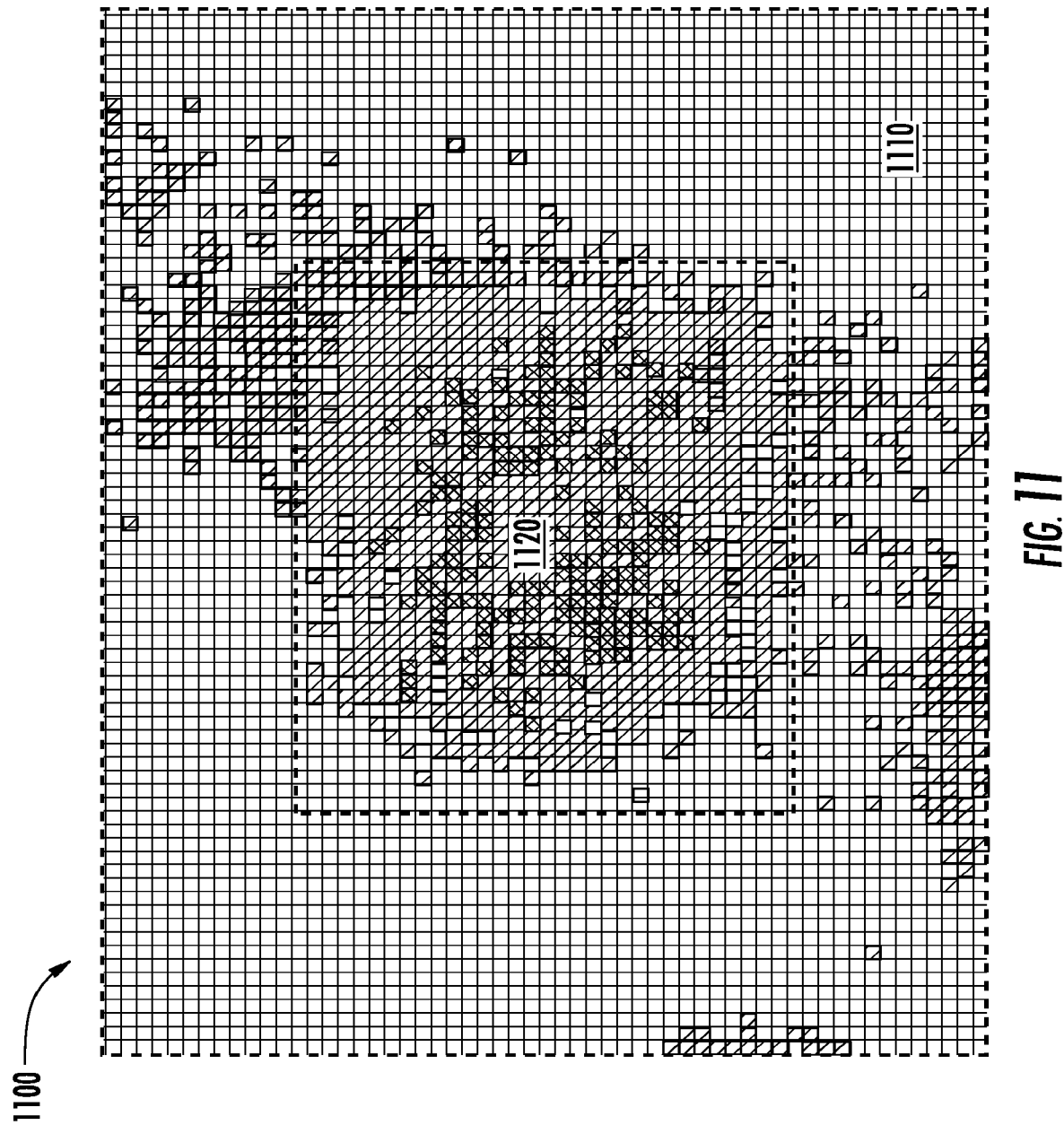
FIG. 11 illustrates a camera display for a uniformity correction step of a camera system in an imaging pipeline calibration method, according to some embodiments.

FIG. 11 illustrates a camera display 1100 for a uniformity correction step of a camera system in an imaging pipeline calibration method, according to some embodiments. Camera display 1100 may be a 2D sensor array, as discussed in detail above in relation to FIG. 1. In some embodiments, method 300 (cf. FIG. 3) may include a step for detecting display artifacts such as black mura. Black mura may negatively affect the uniformity of camera system 150. Accordingly, a spatial correction is conducted to minimize the effect of any spatial non-uniformity of the intensity of the illumination or of the sensitivity of the camera CCD array. FIG. 11 shows an example of non-uniformity effect on mura detection at display edge portion 1110. It can be seen that the middle portion 1120 of display 1100 has very similar luminance intensity to the mura area at the edge. This increases the complexity of mura detection from a uniform display.

Figure 12:
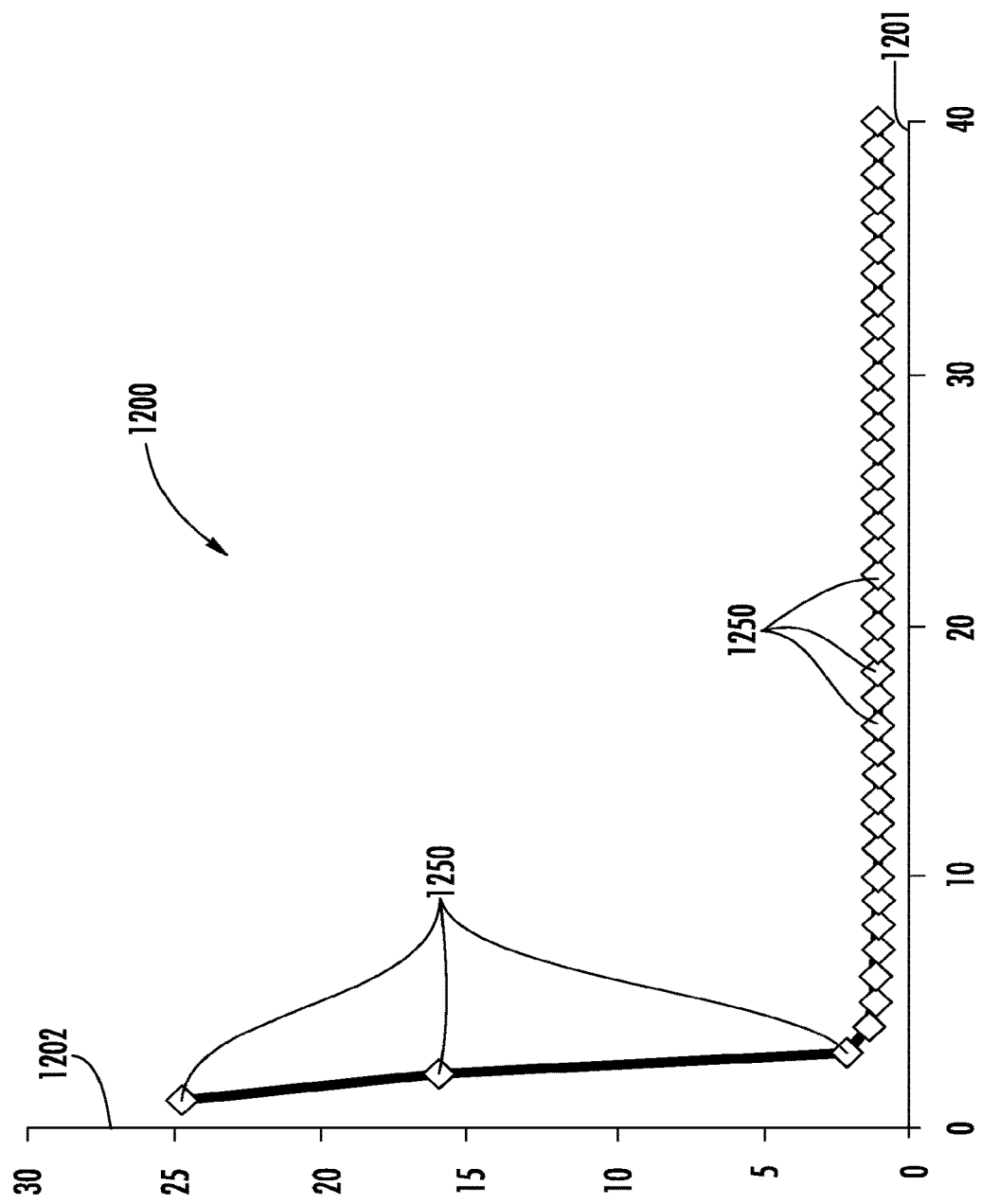
FIG. 12 illustrates an error average chart in an imaging pipeline calibration method, according to some embodiments.

FIG. 12 illustrates an error average chart 1200 in an imaging pipeline calibration method, according to some embodiments. Chart 1200 may be the result of several iterations in method 800, described in detail above. The abscissa in chart 1200 corresponds to the dimensionality of the predictor set (κ). The ordinate in chart 1200 corresponds to the error obtained for the selected predictor seat at the end of each iteration sequence, in step 845. In this particular example, in chart 1200 the predictor set is formed from colors selected from a training set including the 729 samples of FIGS. 7A and 7B. Characterization target 120 is applied to train the characterization model and tested by the 729 samples. FIG. 12 shows the performance in terms of CIEDE2000 against the number of the samples selected by method 800. It can be seen that the model performance stabilized at mean of one (1) error (E00) units with as few as four (4) training samples. Accordingly, it is desirable to determine which set of four training samples provides the optimal performance, so that this set is used for a CCM in any one of imaging pipeline methods 200, 300, and 400 (cf. FIGS. 2, 3, and 4).

Figure 13B:
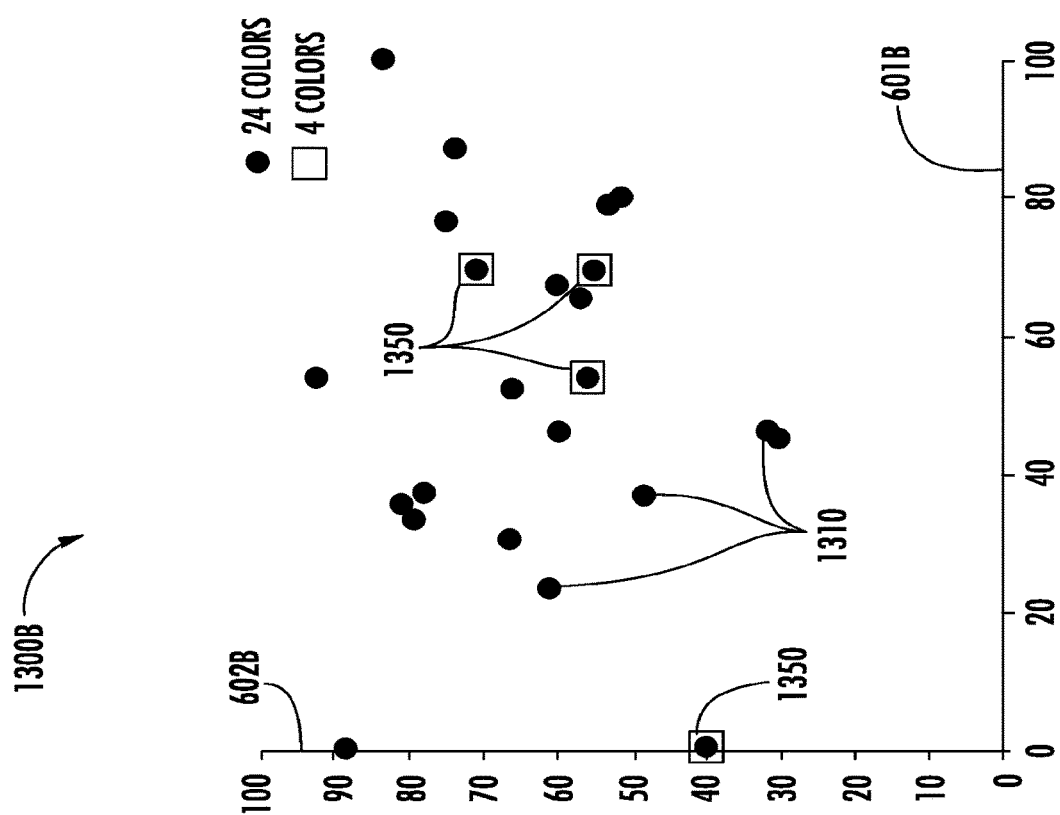
FIG. 13B illustrates a color distribution chart for a plurality of training samples in an imaging pipeline calibration method, according to some embodiments.
Figure 13A:
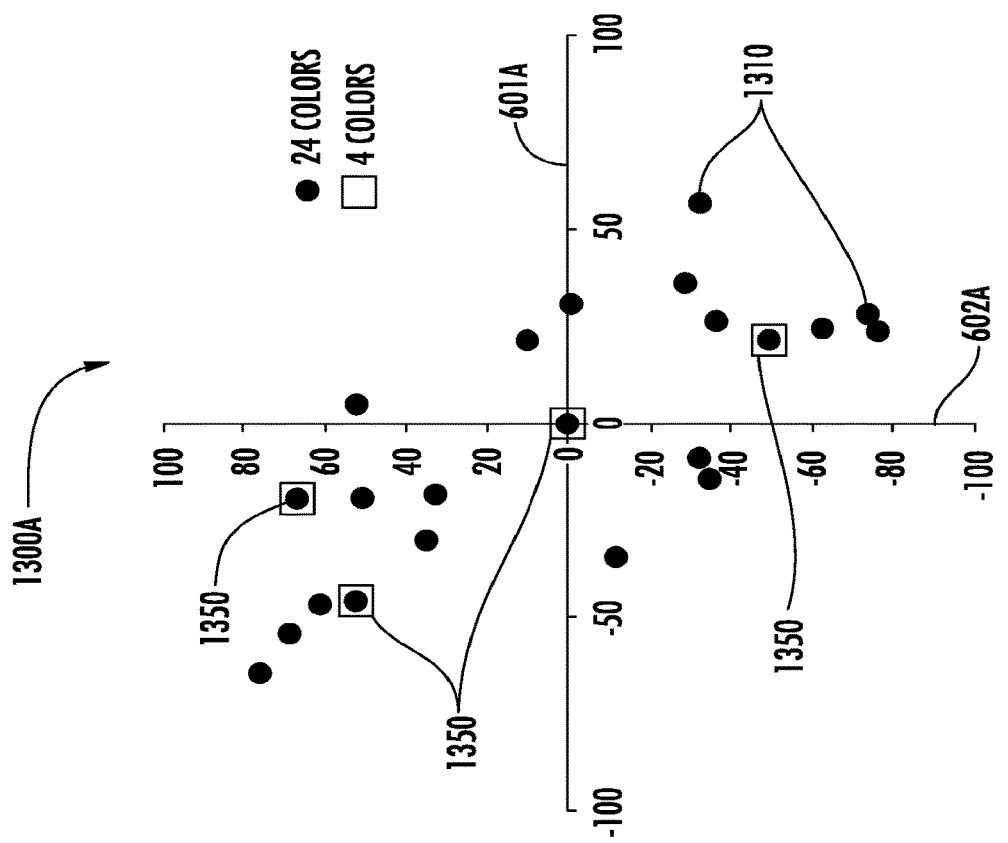
FIG. 13A illustrates a color distribution chart for a plurality of training samples in an imaging pipeline calibration method, according to some embodiments.

FIGS. 13A and 13B illustrate color distribution charts 1300A and 1300B for a plurality of training samples 1310 in an imaging pipeline calibration method, according to some embodiments. The abscissae and ordinate in chart 1300A are 601A and 601A, (cf. FIG. 6A). The abscissae and ordinate in chart 1300B are 601B and 602B, respectively (cf. FIG. 6B). Accordingly, charts 1300A and 1300B display the color chart result for the training sample points 710 using method 800 up to the fourth iteration (κ=4), as described in FIG. 12, above. Chart 1300A displays the four training samples (open squares) selected in the preferred predictor set (CCM) in method 800 in an a*b* plot. Chart 1300B displays the four training samples (open squares) selected in the preferred predictor set (CCM) in method 800 in an L*Ca*b* plot. The four training samples in the preferred predictor set are grey, cyan, yellow and magenta as shown in the FIGS. 13A and 13B. The 24 relevant samples of the 729 colors from the display gamut are also plotted. As expected, the training sample points (red circles) fall approximately at the center of the predicted values (open squares). The test colors in set 710 cover the display color gamut and include grey scale and saturation colors.

Embodiments consistent with the present disclosure include a complete imaging pipeline for the new combo device: spectro-colorimeter, including the exposure time, dark current normalization, color correction matrix derivation, and flat field calibration. In some embodiments the imaging pipeline achieves a colorimeter accuracy better than two (ΔE<2) for 729 test samples covering the full bandwidth of the color space. Imaging pipelines as disclosed herein enable close-loop master-slave calibration of spectrometer system 160 and camera system 150. Therefore, embodiments as disclosed herein integrate two device components into a system, providing the imaging capability with spectrometer accuracy.

Embodiments consistent with the present disclosure may include applications in the display test industry as well as the machine vision field. Other applications may be readily envisioned, since an imaging pipeline consistent with embodiments as disclosed herein integrate two different hardware components such as a camera system 150 and a spectrometer system 160.

Figure 14:
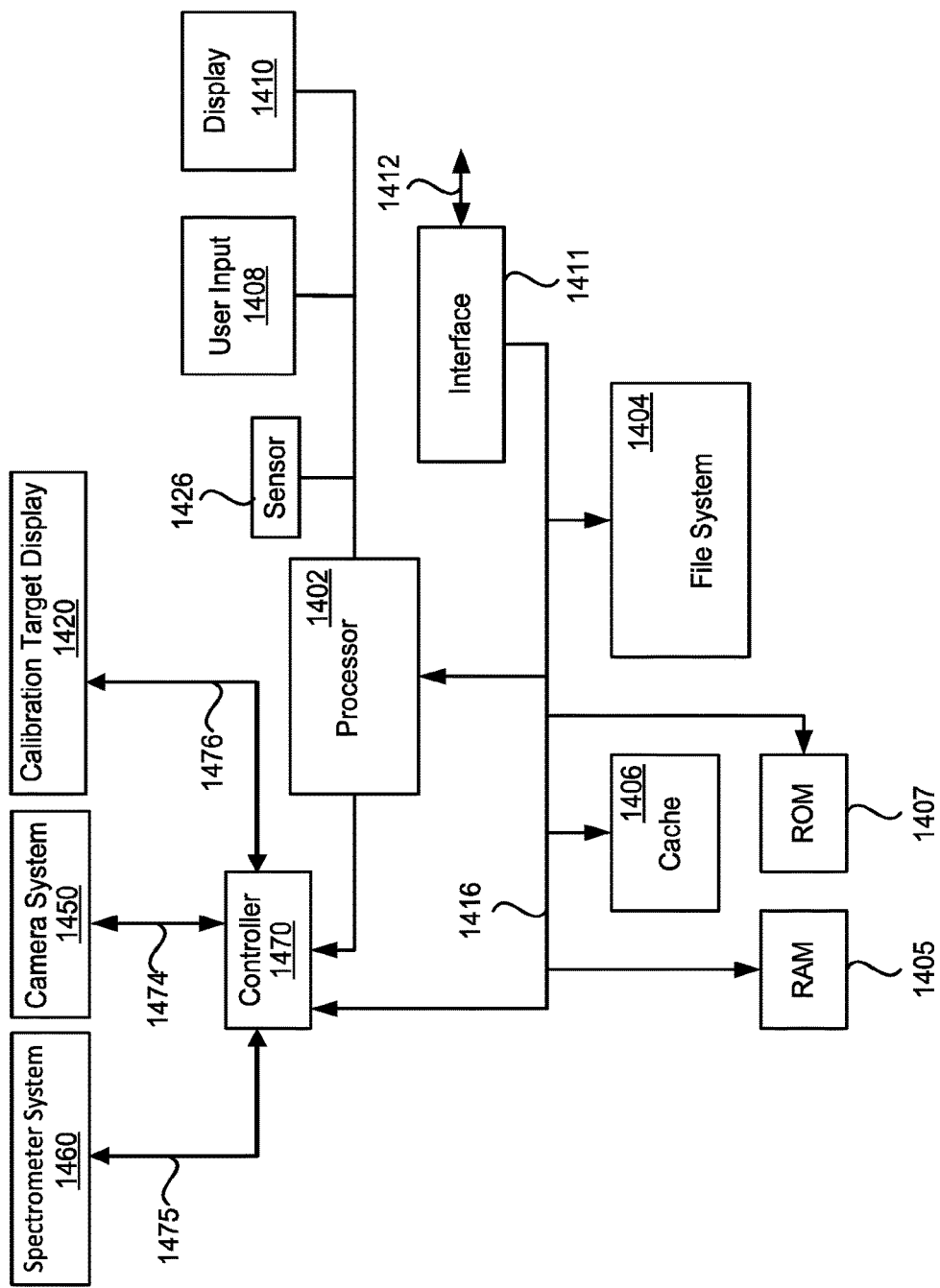
FIG. 14 illustrates a block diagram of a spectro-colorimeter system for handling an imaging pipeline, according to some embodiments.

FIG. 14 illustrates a block diagram of a spectro-colorimeter system 1400 for handling an imaging pipeline, according to some embodiments. Spectro-colorimeter system 1400 includes a spectrometer system 1460 and a camera system 1450 used in an imaging pipeline as described above. Furthermore, Spectro-colorimeter system 1400 may include a calibration target display 1420 used in a calibration method for an imaging pipeline consistent with embodiments disclosed herein.

Spectro-colorimeter system 1400 can include circuitry of a representative computing device. For example, spectro-colorimeter system 1400 can include a processor 1402 that pertains to a microprocessor or controller for controlling the overall operation of spectro-colorimeter system 1400. Spectro-colorimeter system 1400 can include instruction data pertaining to operating instructions, such as instructions for implementing and controlling user equipment, in file system 1404. File system 1404 can be a storage disk or a plurality of disks. In some embodiments, file system 1404 can be flash memory, semiconductor (solid state) memory or the like. File system 1404 can provide high capacity storage capability for the spectro-colorimeter system 1400. In some embodiments, to compensate a relatively slow access time for file system 1404, spectro-colorimeter system 1400 can also include a cache 1406. Cache 1406 can include, for example, Random-Access Memory (RAM) provided by semiconductor memory, according to some embodiments. The relative access time for cache 1406 can be substantially shorter than for file system 1404. On the other hand, file system 1404 may include a higher storage capacity than cache 1406. Spectro-colorimeter system 1400 can also include a RAM 1405 and a Read-Only Memory (ROM) 1407. ROM 1407 can store programs, utilities or processes to be executed in a non-volatile manner. RAM 1405 can provide volatile data storage, such as for cache 1406.

Spectro-colorimeter system 1400 can also include user input device 1408 allowing a user to interact with the spectro-colorimeter system 1400. For example, user input device 1408 can take a variety of forms, such as a button, a keypad, a dial, a touch screen, an audio input interface, a visual/image capture input interface, an input in the form of sensor data, and any other input device. Still further, spectro-colorimeter system 1400 can include a display 1410 (screen display) that can be controlled by processor 1402 to display information, such as test results and calibration test results, to the user. Data bus 1416 can facilitate data transfer between at least file system 1404, cache 1406, processor 1402, and controller 1470. Controller 1470 can be used to interface with and control different devices such as camera system 1450, spectrometer system 1460, and calibration target display 1420. Controller 1470 may also control or motors to position mirror/lens through appropriate codecs. For example, control bus 1474 can be used to control camera system 1450.

Spectro-colorimeter system 1400 can also include a network/bus interface 1411 that couples to data link 1412. Data link 1412 allows spectro-colorimeter system 1400 to couple to a host computer or to accessory devices or to other networks such as the internet. In some embodiments, data link 1412 can be provided over a wired connection or a wireless connection. In the case of a wireless connection, network/bus interface 1411 can include a wireless transceiver. In some embodiments, sensor 1426 includes circuitry for detecting any number of stimuli. For example, sensor 1426 can include any number of sensors for monitoring environmental conditions such as a light sensor such as a photometer, a temperature sensor and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A spectro-colorimeter system for imaging pipeline comprising:
   a camera system including a separating component and a camera, the camera further comprising an RGB camera and the separating component further comprising a mirror, said mirror further comprising an aperture, used to direct a first portion of an incident light to the camera system;
   a spectrometer system including an optical channel, a slit, and a spectroscopic resolving element, the separating component directing a second portion of the incident light to the spectrometer system through the optical channel; and
   a controller coupling the camera system and the spectrometer system, wherein:
   the camera system provides a color image with the first portion of the incident light;
   the spectrometer system provides CIE colorimetric values from the second portion of the incident light; and
   the controller receives RGB data from the camera system; receives CIE colorimetric data from the spectrometer system; provides a color correction matrix transforming the RGB value provided by the camera system into CIE colorimetric values; and provides an error correction to the camera system so that camera system imaging settings are adjusted.

2. The spectro-colorimeter system of claim 1, wherein the spectrometer system comprises at least one from the group consisting of a Bayer-filter array, a Foveon filter array, and a time-sequential configuration.

3. The spectro-colorimeter system of claim 1, wherein the separating component further comprises a mirror having an aperture.

4. The spectro-colorimeter system of claim 1, wherein the optical channel comprises at least one from the group consisting of a transparent conduit, a lens, a mirror, and free space optics.

5. The spectro-colorimeter system of claim 1, wherein the controller adjusts a camera system accuracy according to a spectrometer system accuracy.

6. The spectro-colorimeter system of claim 1, wherein the resolving element is a diffraction grating or a prism.

* * * * *